(12) United States Patent
Sommer

(10) Patent No.: US 12,160,128 B2
(45) Date of Patent: Dec. 3, 2024

(54) SUBSEA POWER BUS SYSTEM

(71) Applicant: ONESUBSEA IP UK LIMITED, London (GB)

(72) Inventor: Burkhard Sommer, Houston, TX (US)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 18/701,504

(22) PCT Filed: Dec. 2, 2022

(86) PCT No.: PCT/US2022/051702
§ 371 (c)(1),
(2) Date: Apr. 15, 2024

(87) PCT Pub. No.: WO2023/102216
PCT Pub. Date: Jun. 8, 2023

(65) Prior Publication Data
US 2024/0333010 A1    Oct. 3, 2024

Related U.S. Application Data

(60) Provisional application No. 63/264,796, filed on Dec. 2, 2021.

(51) Int. Cl.
*H02J 7/00* (2006.01)
*H02J 7/34* (2006.01)

(52) U.S. Cl.
CPC .......... *H02J 7/0071* (2020.01); *H02J 7/0047* (2013.01); *H02J 7/0068* (2013.01); *H02J 7/345* (2013.01)

(58) Field of Classification Search
CPC ...... H02J 7/0071; H02J 7/0047; H02J 7/0068; H02J 7/345
See application file for complete search history.

(56) References Cited

U.S. PATENT DOCUMENTS 8,188,609 B2    5/2012   Baarman et al.
8,212,410 B2    7/2012   Biester et al.
(Continued)

FOREIGN PATENT DOCUMENTS

KR    10-2012-0091642 A    8/2012

OTHER PUBLICATIONS

International Search Report and Written Opinion issued in PCT Appl. No. PCT/US2022/051702 on Apr. 17, 2023; 11 pages.
(Continued)

*Primary Examiner* — Jared Fureman
*Assistant Examiner* — Duc M Pham
(74) *Attorney, Agent, or Firm* — Jeffrey D. Frantz

(57) ABSTRACT

A system includes a subsea power system. The subsea power system includes a bus. A plurality of energy storage units is coupled to the bus at a plurality of positions distributed throughout the subsea power system. The subsea power system also includes a controller. The controller includes a memory, a processor, and instructions stored on the memory and executable by the processor. The processor is configured to control the subsea power system to selectively discharge a first energy storage unit of the plurality of energy storage units over the bus to supply power to a first electrical actuator of a plurality of electrical actuators. The processor is also configured to control the subsea power system to selectively charge a second energy storage unit of the plurality of energy storage units over the bus via power from a power supply.

20 Claims, 14 Drawing Sheets

(56) References Cited

U.S. PATENT DOCUMENTS

| | | | | |
|---|---|---|---|---|
| 8,789,606 | B1* | 7/2014 | Lugo | E21B 33/064 |
| | | | | 166/85.4 |
| 2005/0029476 | A1* | 2/2005 | Biester | F16K 31/046 |
| | | | | 251/58 |
| 2010/0127566 | A1 | 5/2010 | Biester et al. | |
| 2014/0340852 | A1 | 11/2014 | Carter | |
| 2019/0319457 | A1* | 10/2019 | Di Maio | H02J 3/32 |
| 2024/0007024 | A1* | 1/2024 | Pathak | H02J 7/0013 |

OTHER PUBLICATIONS

International Preliminary Report on Patentability of International Patent Application No. PCT/US2022/051702 dated Jun. 13, 2024, 5 pages.

* cited by examiner

SUBSEA POWER BUS SYSTEM

CROSS REFERENCE TO RELATED APPLICATION

This application is the National Stage Entry of International Application No. PCT/US2022/051702, filed Dec. 2, 2022, which claims priority from and the benefit of U.S. Provisional Application No. 63/264,796, entitled "Power Bus System for Subsea Production Equipment," filed Dec. 2, 2021, which is hereby incorporated by reference in its entirety.

BACKGROUND

The present disclosure generally relates to systems and methods for delivering electrical power to subsea production equipment.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

In subsea applications, various types of infrastructure may be positioned along a sea floor and coupled by electrical lines. There is a tendency to equip subsea trees with electric actuators. Many electric subsea trees, manifolds, or boosting stations actuations utilize a centralized power configuration, whereby power is distributed to a plurality of subsea electric actuators from a centralized power source (e.g., centralized battery). One disadvantage of the centralized power configuration is that the operator can proceed to shut down the system only if at least one power source is functional. Operators may not accept the risk of running the system on only one centralized power source, given that this would be the only means of shutting the system down. For at least this reason, a need exists for developing systems and methods for a more reliable and convenient power system for subsea actuators.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system may include a subsea power system. The subsea power system may include a bus. A plurality of energy storage units may be coupled to the bus at a plurality of positions distributed throughout the subsea power system. The subsea power system may also include a controller. The controller may include a memory, a processor, and instructions stored on the memory and executable by the processor. The processor may be configured to control the subsea power system to selectively discharge a first energy storage unit of the plurality of energy storage units over the bus to supply power to a first electrical actuator of a plurality of electrical actuators. The processor may also be configured to control the subsea power system to selectively charge a second energy storage unit of the plurality of energy storage units over the bus via power from a power supply.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
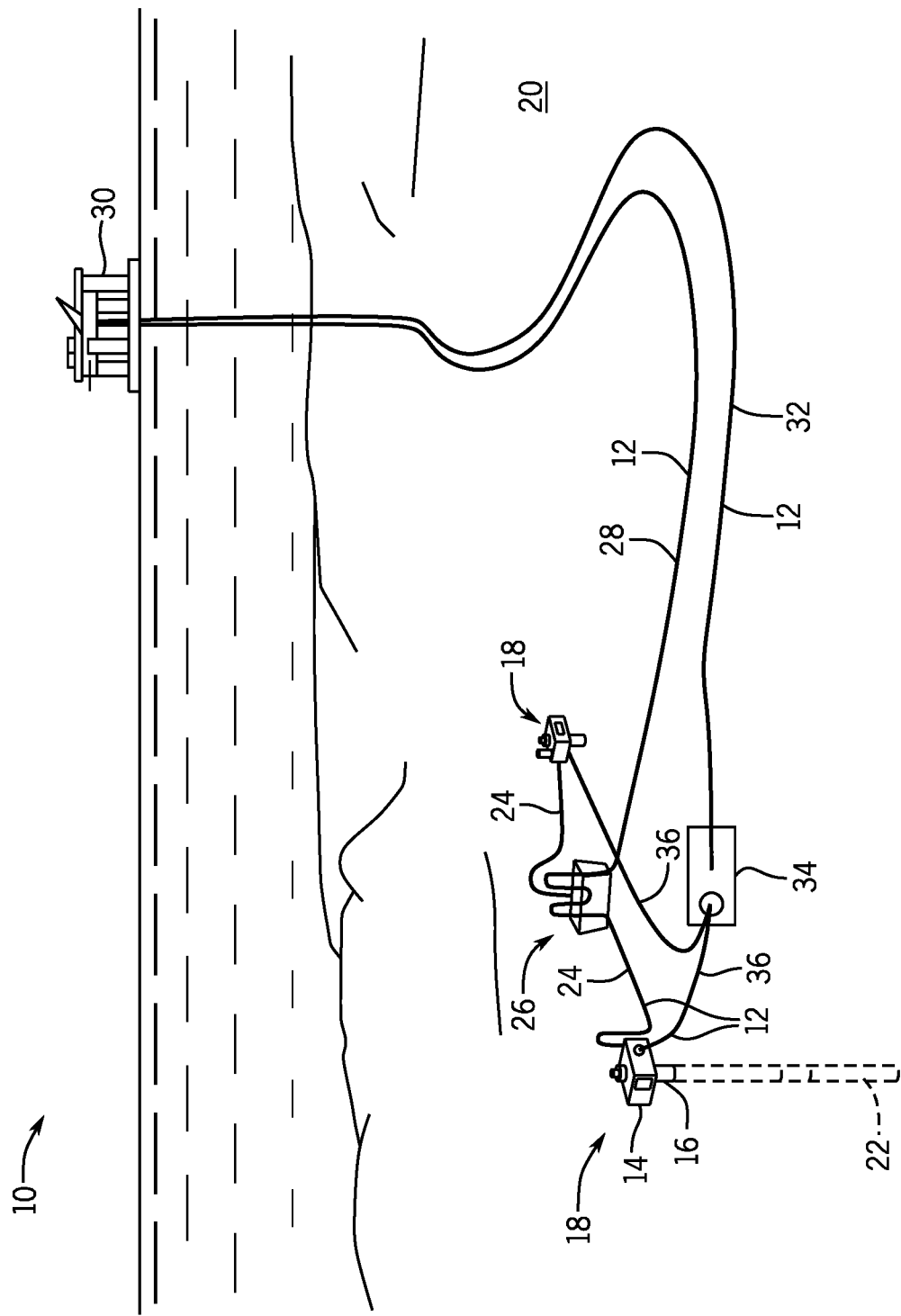
FIG. 1 a schematic view of a subsea production system having a subsea power system, according to an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The present disclosure is generally directed toward systems and methods of delivering electrical power to subsea production equipment. As discussed above, energy storage units (e.g., batteries, supercapacitors, fuel cells, etc.) may be used for actuating subsea actuators (e.g., electrical actuators) located on trees (e.g., subsea injection or production trees, etc.), manifolds (e.g., subsea injection or production manifolds), and/or substations (e.g., subsea boosting stations). These actuators may be powered by a centralized energy storage unit in a centralized configuration. However, the centralized configuration may lead to a loss of power to the actuators in the scenario that the centralized energy storage unit fails, either due to an unforeseen cause or overuse. An additional disadvantage of the centralized configuration occurs during startup and shutdown of the subsea system. In some scenarios, the centralized energy storage unit is needed to power equipment during startup/shutdown. There is a higher risk involved with shutting down the system using only a single centralized energy storage unit, since only one energy storage unit is responsible for shutting down the entire subsea system.

As such, in certain embodiments of the present disclosure, a decentralized or distributed energy storage system having a plurality of energy storage units is electrically coupled to the electrical actuators via one or more buses. One or more controllers control the selective charging of the plurality of energy storage units (e.g., via a cabled power supply), and the selective discharging of the plurality of energy storage units (e.g., power distribution) to power one or more electrical actuators.

In certain embodiments, the one or more controllers may analyze one or more factors of the plurality of energy storage units (e.g., spatial relationship to actuators, electrical capacity, etc.) and select (e.g., match) one or more energy storage units for powering one or more electrical actuators. The one or more controllers may also analyze an operational parameter of the plurality of energy storage units, historical data of the plurality of energy storage units, a computer model, or a combination thereof, in order to produce the analysis.

In other embodiments, the one or more controllers may stagger the charge and discharge cycles of two or more subsets of the plurality of energy storage units, so as to provide a variable end of life of the plurality of energy storage units. In this manner, only a portion of the plurality of energy storage units may need to be replaced at any given time. The one or more controllers may also charge and discharge the plurality of energy storage units evenly, so as to ensure that one or more of the plurality of energy storage units reach an end of life near the same time (e.g., substantially even end of life).

With the foregoing in mind, FIG. 1 is a schematic view of a subsea system 10 with electrical cables 12 used for transmitting information and primary electrical power for various subsea components (e.g., actuators, sensors, etc.). The subsea system 10 may include a subsea hydrocarbon production system configured to extract oil or gas from a subterranean reservoir, a subsea fluid injection system configured to inject fluid (e.g., liquid or gas) into a subterranean reservoir, or any other subsea system associated with subterranean reservoirs. For example, the subsea fluid injection system may include a subsea gas, water, and/or carbon dioxide ($CO_2$) injection system. In certain embodiments, the subsea system 10 may include a subsea tree 14 coupled to a wellhead 16 to form a subsea station 18 configured to extract and/or inject fluids relative to a subterranean reservoir. For example, the subsea station 18 may be configured to extract formation fluid, such as oil and/or natural gas, from the sea floor 20 through the well 22. By further example, the subsea station 18 may be configured to inject CO2 into the subterranean reservoir. In some embodiments, the subsea system 10 may include multiple subsea stations 18 that extract and/or inject fluids relative to respective wells 22.

In embodiments of the subsea system 10 configured for production, after passing through the subsea tree 14, the formation fluid flows through fluid conduits or pipes 24 to a pipeline manifold 26. The pipeline manifold 26 may connect to one or more flowlines 28 to enable the formation fluid to flow from the wells 22 to a surface platform 30. In some embodiments, the surface platform 30 may include a floating production, storage, and offloading unit (FPSO) or a shore-based facility. In addition to flowlines 28 that carry the formation fluid away from the wells 22, the subsea system 10 may include lines or conduits 32 that supply fluids, as well as carry control and data lines to the subsea equipment. These conduits 32 connect to a distribution module 34, which in turn couples to the subsea stations 18 via supply lines 36. In some scenarios, the platform 30 may be located a significant distance (e.g., greater than 100 m, greater than 1 km, greater than 10 km, or greater than 60 km) away from the wells 22. As discussed in further detail below, the subsea system 10 (e.g., the subsea tree 14, the subsea station 18, the pipeline manifold 26, and/or the distribution module 34) may include a subsea power system (e.g., subsea power bus system) that provides secondary power from energy storage units (e.g., batteries, fuel cells, or super capacitors (for initial actuator movement)) over one or more buses to various subsea components (e.g., actuators, sensors, etc.). For example, the subsea power system may be configured to provide secondary power, such as during a power loss from the primary power from the electrical cables 12, to operate various valves, sensors, and other subsea components. While the subsea system described above is for extracting hydrocarbons, it should be understood that the present disclosure may also apply to other types of subsea systems 10 such as subsea injection systems (e.g., subsea gas injection system, subsea water injection system, subsea carbon dioxide injection system).

Figure 2:
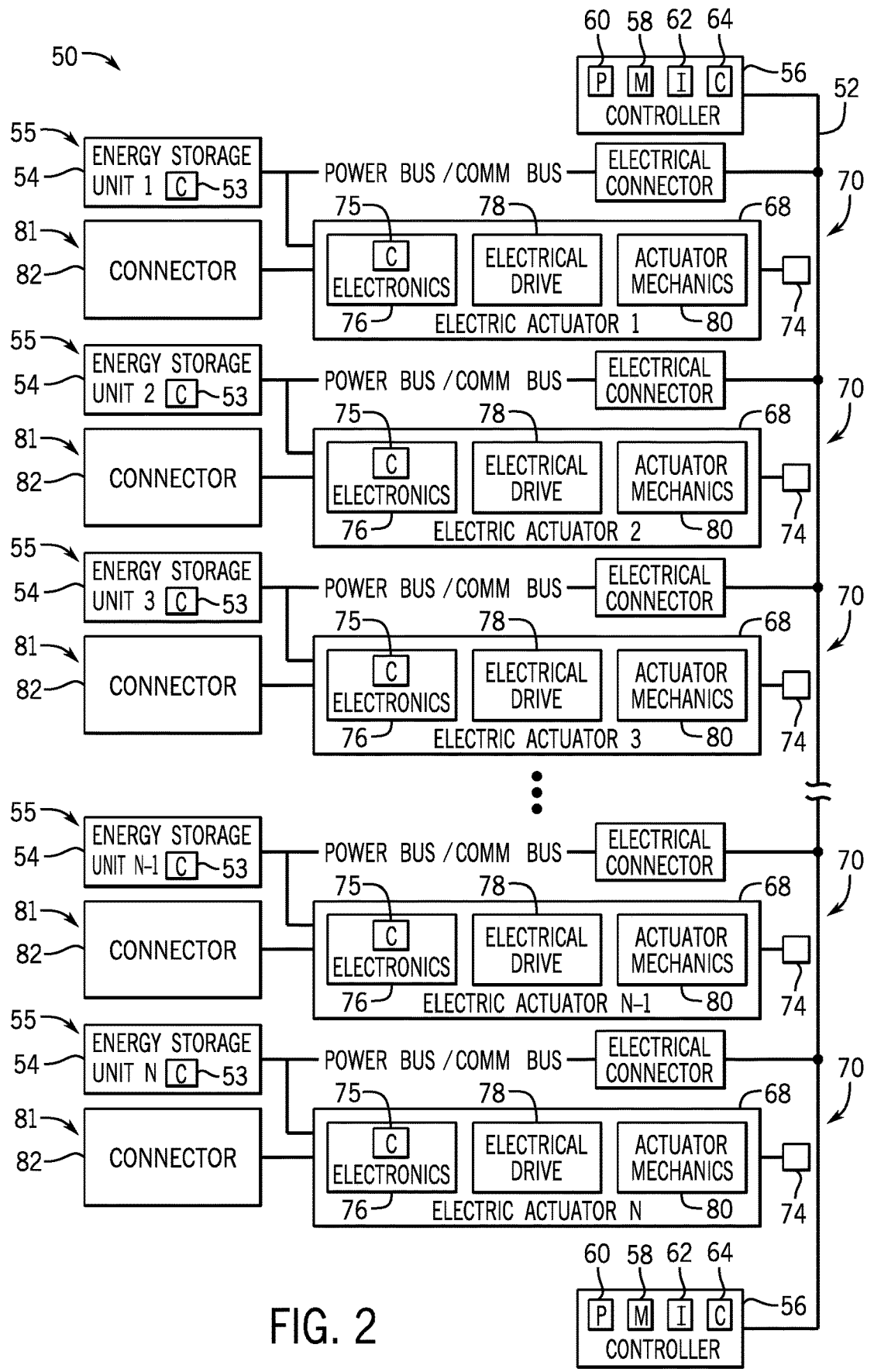
FIG. 2 is a schematic view of the subsea power system of FIG. 1, according to an embodiment of the present disclosure.

FIG. 2 is a schematic view of an embodiment of the subsea power system 50 coupled to the subsea system 10 of FIG. 1. The subsea power system 50 includes a bus 52 and a plurality of energy storage units 54 electrically coupled to the bus 52 at a plurality of positions 55 distributed throughout the subsea power system 50. The subsea power system 50 is configured to provide electrical power (e.g., secondary power) from the energy storage units 54 over the bus 52 to a plurality of electrical actuators 70 coupled to respective subsea components 74. In certain embodiments, the bus 52 includes an electrical bus and a data bus extending to the plurality of energy storage units 54 and the plurality of electrical actuators 70. The bus 52 may include a network or grid of electrical and/or data cables. The bus 52 may extend over distances of about 5 to 200 meters, or 10 to 100 meters, or another suitable range depending on electrical capacity of the energy storage units 54, power demand of the electrical actuators 70, and electrical losses over the distances. The bus 52 may include one or more of a 24V bus, a 48 bus, a 72V bus, a 96V bus, or a suitable bus 52 between 24V to 800V or 24V to 400V. In certain embodiments, the bus 52 may include multiple power buses 52 of different voltages. The energy storage units 54 may include any suitable number, size, and electrical capacity of batteries, fuel cells (e.g., hydrogen fuel cells), supercapacitors, or any combination thereof. For example, the number, size, and/or electrical capacity of the energy storage units 54 may be based on the number and/or electrical demand of the electrical actuators 70, a factor of safety to ensure redundant and/or excess power supply above the maximum amount needed for the electrical actuators 70, a spatial distribution of the electrical actuators 70 and distances over the bus 52, expected electrical losses over the bus 52, or any combination thereof. The number, size, and/or electrical capacity of the energy storage units 54 are discussed in further detail below.

The subsea power system 50 also includes one or more controller(s) 56. The controller(s) 56 include a memory 58, a processor 60, instructions 62 stored on the memory and executed by the processor 60, and communication circuitry 64. Similarly, each of the energy storage units 54 may include a controller 53 and each of the electrical actuators 70 may include a controller 75, wherein the controllers 53 and 75 may include a processor, memory, instructions, and communication circuitry. The controllers 56, 53, and 75 may operate independently and/or in combination with one another to facilitate control of the subsea power system 50 and operation of the subsea components 74 driven by the electrical actuators 70. For example, the instructions 62, when executed by the processor 60, enable the controller(s) 56 to control the subsea power system 50 to selectively discharge at least one of the plurality of energy storage units 54 over the bus 52 to supply power to at least one of the plurality of electrical actuators 70 coupled to a respective one of the plurality of subsea components 74. The instructions 62, when executed by the processor 60, also enable the controller(s) 56 to control the subsea power system 50 to selectively charge one or more of the plurality of energy storage units 54 over the bus 52 via power from a power supply coupled to the electrical cable 12. The controllers 53 and/or 75 also may provide the same or similar control features as the controllers 56. Additional details of control features of the controllers, 53, 56, and 75 are discussed in further detail below with reference to FIGS. 3-14.

In the illustrated embodiment, the subsea power system 50 is electrically coupled to the plurality of electrical actuators 70 via the bus 52, wherein each of the plurality of subsea components 74 is driven by one of the respective plurality of electrical actuators 70. As discussed above, one or more subsea structures (e.g., tree, manifold, substation, etc.) may include the plurality of subsea components 74. The plurality of subsea components 74 may include various flow control equipment, such as valves, pumps, water injection systems, chemical injection systems, or any combination thereof. For example, the subsea components 74 may include a variety of valves, such as gate valves, ball valves, blowout preventers (BOPs), chokes, or any combination thereof. The water and chemical injection systems also may include valves, pumps, flowmeters, and other flow control equipment. The subsea components 74 also may include a variety of sensors or monitoring equipment, such as flow meters, temperature sensors, pressure sensors, water sensors, fluid composition sensors, leak sensors, or any combination thereof. Each of the foregoing subsea components 74 may be configured to receive primary power via the electrical cable 12 and secondary power via the subsea power system 50. For example, during normal operation, the controller(s) 56 selectively controls the primary power supplied via the electrical cable 12 to power the subsea components 74 and selectively charge the energy storage units 54 via the bus 52 of the subsea power system 50. However, if the primary power is unavailable when power is needed to operate one or more of the subsea components 74, then the controller(s) 56 selectively controls the subsea power system 50 to provide the secondary power from one or more of the energy storage units 54 over the bus 52 to the appropriate electrical actuators 70 to operate the respective subsea components 74.

Each of the plurality of electrical actuators 70 may include electronics 76, an electrical drive 78, and actuator mechanics 80. The electronics 76 may include power electronics and the controller 75 (e.g., control board, processor, memory, instructions, and communication circuitry). The electrical drive 78 may include a direct current (DC) motor, an alternating current (AC) motor, a servomotor, a linear drive, a rotary drive, or any combination thereof. The actuator mechanics 80 may include a transmission, a gear assembly or gearbox, one or more shafts, a rotary to linear converter, a position lock, a position sensor, or any combination thereof. In certain embodiments, the electric actuators 70 may use electrical power to operate in opposite first and second directions of actuation, such as both clockwise and counterclockwise rotational directions and/or both forward and rearward axial directions. Thus, in an embodiment of the subsea component 74 including a valve, the electrical actuator 70 may be configured to use the electrical power to operate the electric drive 78 for both opening and closing of the valve. In certain embodiments, the electrical actuator 70 may exclude a spring or biasing element configured to bias the actuator in a particular direction, such as spring-biasing the valve toward a normally closed position. Each of the plurality of electrical actuators 70 may also include an interface 81 having one or more connectors 82 for independently coupling with each respective electrical actuator 70. The connectors 82 may include mechanical connectors and electrical connectors, such as stab connectors, rotational connectors, quick connect/disconnect couplings, or a combination thereof. The plurality of electrical actuators 70 may also include integrated harnesses, stab connectors, or a combination thereof, thereby allowing each actuator 70 to be retrievable via a remotely operated vehicle (ROV) via an ROV interface (e.g., the interface 81). In certain embodiments, each of the plurality of energy storage units 54 may be packaged with a corresponding electrical actuator 70 or, in certain embodiments, the plurality of energy storage units 54 may be separate from the plurality of electrical actuators 70. In certain embodiments, the plurality of energy storage units 54 are retrievable (e.g., ROV-retrievable) independently from the plurality of electrical actuators 70. In some embodiments, the plurality of energy storage units 54 and the plurality of electrical actuators 70 are packaged together as packaged unit or module, wherein the module may be retrievable (e.g., ROV-retrievable) or non-retrievable (e.g., fixedly mounted or permanently installed at a subsea structure). In some embodiments, the plurality of energy storage units 54 are retrievable (e.g., ROV-retrievable) while the plurality of electric actuators 70 are non-retrievable (e.g., fixedly mounted or permanently installed at a subsea structure). In the illustrated embodiment, the plurality of energy storage units 54 may be removed and replaced while the subsea power system 50 is in operation (e.g., hot stand-by mode).

In certain embodiments, the subsea system 10 may include an actuation system of the electrical actuators 70 and the energy storage units 54 (e.g., batteries) on the bus 52 of the subsea power system 50 with the below components and features. The actuation system may be based on a 48V power bus system of the subsea power system 50. The actuation system may include dedicated redundant isolated power supplies for battery charging of actuation systems, e.g., energy storage units 54 coupled to electrical actuators 70 over the bus 52. The subsea power system 50 may include a local subsea energy grid for cross-powering of electric consumers, such as the electrical actuators 70. The actuation system may include integrated harnesses and stab connectors at a subsea mounting base and actuator side of the electrical actuators 70. The electrical actuators 70 may include subsea (ROV retrievable) actuators with mechanical and electric quick connect arrangements, or non-subsea retrievable pluggable electric actuators 70 with energy storage units 54 (e.g., batteries).

In certain embodiments, the subsea power system 50 includes the below components and features. For example, the subsea power system 50 may include prioritization of battery charging cycles for asynchronous charging (planned wear) to prevent energy storage units 54 (e.g., batteries) to reach end of life at the same time, and compact energy storage units 54 (e.g., batteries) may be individually retrievable from electrical actuators 70. The subsea power system 50 may include super capacitors to support high currents during initial phase of motor movements (break-out torque). The super capacitors may have a voltage rating suitable for the bus 52, such as, but not limited to, 24V, 48V, 72V, 96V, or a voltage rating between 24V to 800V or 24V to 400V. The energy storage units 54 (e.g., batteries) can actively be enabled/disabled from discharging, and the energy storage units 54 (e.g., batteries) can actively be removed and replaced while the system is operating. The subsea power system 50 may include user-selectable sequence for "preferred charging and wear" of the energy storage units 54 (e.g., batteries) in accordance to planned shutdowns, but also to avoid unplanned shutdowns due to common cause failures (e.g., identical life cycle of battery, which may cause all batteries to fail during the same time due to common mode failures). The energy storage units 54 (e.g., batteries) may be configured to communicate with each other over the data bus system of the subsea power system 50 to automatically "agree" on which battery ages prior to others.

For purposes of discussion, the following example is presented to describe certain aspects of the subsea power system 50. In certain embodiments of the subsea production systems 10 (e.g., subsea tree systems), approximately 14 electric actuators 70 (N=14) may be used for underwater safety valves, chemical injection valves and chokes. It is assumed that each electric actuator 70 requires a pre-determined energy (E_individual) to execute a full function. For purposes of contrast to the disclosed subsea power system 10, on an arrangement with two big central batteries for the whole local system, the total capacity of such a system might be Energy: E_total=2*14 E_individual=28 E_individual, i.e., the total energy storage for the battery system is as big as the energy stored in 28 individual electrical actuators 70; meaning 14 electrical actuators 70 times 2 for redundancy. This is since each of the two central batteries need to be designed to run all 14 actuators. In the disclosed embodiments of the subsea power system 50, each energy storage unit 54 (e.g., battery) might be built with a capacity of E_new=1.5*E_individual. If 10 out of 14 energy storage units 54 (e.g., batteries) are fully functional, the subsea power system 50 will still have enough energy to supply all electrical actuators 70 with a Hardware Fault Tolerance of 4 (i.e., 14 batteries are provided but only 10 are needed for the system to operate). The total required capacity of the system is only E_new. This is possible because the advantage of having several smaller energy storage units 54 (e.g., batteries) will lead to cause small impact to the system performance if one or more of the energy storage units 54 (e.g., batteries) fail. Depending on the subsea tree configuration of the subsea system 10, the number of electric actuators 70 and the number of energy storage units 54 (e.g., batteries) can differ from the example presented above. It should be understood by the reader that numerical values used in the formulaic expressions throughout this paragraph are merely examples, and that the present disclosure is not limited to these particular numerical values.

It may be appreciated that the subsea power system 50 may provide a higher hardware fault tolerance (HFT) compared to the central battery system. HFT may be defined as the number of hardware components required for the system to fail. In contrast to the central battery system having a HFT=1 (regarding the battery system), some embodiments of the subsea power system 50 have E_total=28*E_individual and system shutdown may be initiated with 1 energy storage unit 54 (e.g., battery) failure. Some embodiments of the subsea power system 50 enable a HFT=4 (regarding the battery system), E_total=21 E_individual (25% lower than above) and a system shutdown that may be initiated only after 3 energy storage unit 54 (e.g., battery) failures. It should be understood by the reader that numerical values used in the formulaic expressions throughout this paragraph are merely examples, and that the present disclosure is not limited to these particular numerical values.

Considering the size of the subsea production equipment structures, the length of the subsea power system 50 in some embodiments may be around 30-50 meters. In certain embodiments, one may use a 24 VDC system to power the bus 52, but it might be a challenge in order to provide sufficient power from one energy storage unit 54 (e.g., battery) to another electrical actuator 70 over the power bus 52. In certain embodiments, one may use a higher voltage bus 52 that will provide a more effective power transmission. For example, the bus 52 may be rated at a voltage level from approximately 48V, 72V, or 96V up to 400V, 600V, 800V, or higher. In certain embodiments, the expected required maximum current on the power bus 52 might be between 30 A and 65 A.

Figure 3:
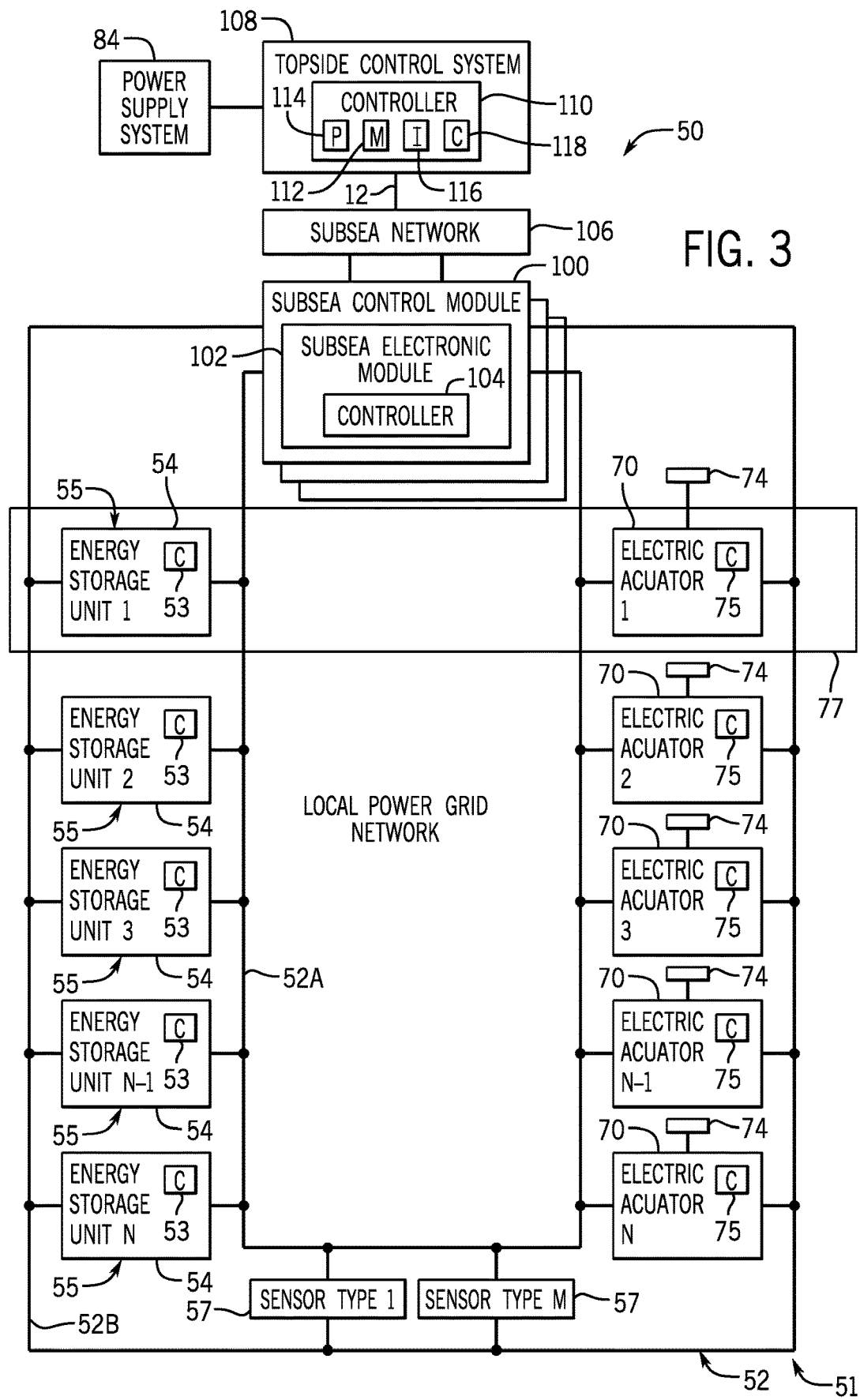
FIG. 3 is a schematic view of the subsea power system of FIG. 1 having a multi-bus configuration, according to an embodiment of the present disclosure.

FIG. 3 is a schematic view of an embodiment of the subsea power system 50 coupled to the subsea system 10 of FIG. 1, further illustrating a multi-bus configuration 51 of the bus 52. The subsea power system 50 may include substantially the same features as discussed above with reference to FIG. 2, unless stated otherwise. As illustrated in FIG. 3, the multi-bus configuration 51 has buses 52A and 52B, each coupled to the plurality of energy storage units 54 and the plurality of electrical actuators 70. The buses 52A and 52B may be used as redundant buses 52, independent buses 52 for independent power distribution to different electrical actuators 70, or other bus specific control features operating with multiple buses 50. Although FIG. 3 illustrates two buses 52A and 52B, the multi-bus configuration 51 may include any number of buses 52, such as 2, 3, 4, 5, or more buses 50. The buses 52 (e.g., 52A and 52B) in the multi-bus configuration 53 may include an electrical power bus and a data bus (e.g., monitoring and control data bus). For example, the buses 52 may include a plurality of sensors 57 (e.g., one or more sensor types) coupled to the buses 52A and 52B, wherein the sensors 57 may include voltage sensors, current sensors, or other health monitoring sensors configured to help track a health, a discharge cycle, a charge cycle, or other parameters of the energy storage units 54. The plurality of sensors 57 may include sensor types 1 through M, wherein M is equal to or greater than 1, 2, 3, 4, 5, 6, 7, 8, 9, 10, or more. The monitored data from the sensors 57 is used for monitoring and control of the subsea power system 50 and the subsea system 10 as discussed below.

The subsea power system 50 has the plurality of energy storage units 54 coupled to the buses 52A and 52B at a plurality of positions 55 distributed throughout the subsea power system 50 and the subsea system 10. The plurality of energy storage units 54 may include a plurality of uniformly distributed energy storage units 54 (e.g., uniformly spaced positions 55), a plurality of non-uniformly distributed energy storage units (54 (e.g., non-uniformly spaced positions 55), or a combination thereof. The positions 55 of the energy storage units 54 may be arranged in a three-dimensional space in vertical and horizontal directions. The energy storage units 54 and the electrical actuators 70 may be arranged in pairs in close proximity to one another, as indicated by box 77 (e.g., within 0 to 5 meters). For example, one of the energy storage units 54 may be directly coupled to or mounted on a respective electrical actuator 70. However, in certain embodiments, the energy storage units 54 may be distributed throughout the bus 52 (e.g., buses 52A and 52B) in a first spatial distribution based on a second spatial distribution of the electrical actuators 70, wherein the first and second spatial distributions are different from one another, and the first spatial distribution is configured to provide an improved distribution of secondary power from the energy storage units 54 to the electrical actuators 70. In operation, the charging and discharging of the energy storage units 54 is controlled by one or more of the controllers 110, 104, 53, and/or 75 as discussed in further detail below.

In certain embodiments, the subsea power system 50 includes subsea control module(s) 100 (SCM) coupled to one or more subsea structures (e.g., trees, manifolds, substations, etc.). The subsea power system 50 may include a plurality of the subsea control modules 100 for redundancy and/or independent control of the buses 52A and 52B in the multi-bus configuration 51. The subsea control module(s) 100 may each include a subsea electronic module 102 having a controller 104, such as the controller 56 discussed in detail above with reference to FIG. 2. The subsea power system 50 may also include a subsea network or subsea distribution network 106 (e.g., subsea power and communication distribution network) coupled to the subsea control module(s) 100. The subsea distribution network 106 may include distribution hardware, such as electrical flying leads, subsea umbilicals, umbilical termination units, and subsea distribution modules. The subsea power system 50 may electrically and communicatively couple the subsea distribution network 106 with a topside control system 108 via one or more umbilicals (e.g., electrical cables 12, subsea telecommunication cables). The topside control system 108 is configured to mount on a host structure, such as a surface vessel, a platform, or a marine vessel on the surface of the water. The topside control system 108 includes a controller 110 having a memory 112, a processor 114, instructions 116 stored on the memory 112 and executed by the processor 114, and communication circuitry 118. The topside control system 108 also may couple with a main power supply 84 for supply of the primary power to the subsea system 10. In certain embodiments, the main power supply 84 may not be a single power source, but may also encompass power received via wave energy power buoys, offshore wind turbines, and other electrical power sources. Also, the topside control system 108 may include a combination of an energy harvesting system and a communication buoy using satellite communication between the subsea infrastructure and a remote control location.

The main power supply 84 may include a power generation system, a power grid, or a combination thereof. For example, the power generation system may include one or more electrical generators driven by a combustion engine, such as a gas turbine engine or a reciprocating piston-cylinder engine. The power generation system may include one or more wind turbines, solar panels, hydro turbines, or other power sources. The main power supply 84 is configured to provide the primary power to the subsea system 10 via control by the topside control system 108 (e.g., controller 110) and/or the subsea control modules 100 and via distribution by the subsea distribution network 106. The topside control system 108 (e.g., controller 110) and/or the subsea control modules 100 may be configured to control a primary power supply from the main power supply 84 to the subsea system 10 for operating various subsea components 74 and/or to the subsea power system 50 for charging one or more of the energy storage units 54.

Additionally, the topside control system 108 (e.g., controller 110), the subsea control modules 100 (e.g., controllers 104), the controllers 53 of the energy storage units 54, and/or the controllers 75 of the electric actuators 70 may be configured to monitor operating parameters and control the subsea power system 50 (e.g., charging and discharging of the energy storage units 54) and monitor operating parameters and control the subsea system 10 (e.g., actuation of the subsea components 74, such as opening and closing valves). For example, the controllers 110, 104, 53, and/or 75 may be configured to monitor the health, charge cycles, discharge cycles, and other parameters of the energy storage units 54, monitor availability of the primary power from the main power supply 84, monitor energy demands for powering the electrical actuators 70 to operate the subsea components 74 based on various conditions or events (e.g., pressure exceeds threshold, component failure, emergency closure of valves, etc.) of the subsea system 10, and control the distribution of secondary power from the energy storage units 54 over the bus 52 (e.g., buses 52A and 52B) based on the various monitored parameters. The health of the energy storage units 54 may include electrical charge level, current level and rate of decline in charge level over time, age, historical discharge and charge cycles, historical diagnostic data, operating data during use for powering electrical actuators 70, or any combination thereof. In certain embodiments, the controllers 110, 104, 53, and/or 75 may be configured to communicate with one another in response to various health conditions (e.g., fault, low charge condition, etc.) of the energy storage units 54 to enable an appropriate control response and/or use intervention. For example, the controllers 53 of the energy storage units 54 may enable self-monitoring and reporting of any health conditions to the controllers 104 and/or 110. The controllers 104 and/or 110 also may perform various monitoring of the energy storage units 54, the electrical actuators 70, the buses 52A and 52B, and other aspects of the subsea power system 50. In certain embodiments, in the event of a sensed health condition being a fault, one of the controllers 53, 104, and/or 110 may trigger an isolation or separation control function, thereby isolating or separating the faulty energy storage unit 54 from the bus 52. Additionally, in the event of a sensed health condition being a low charge condition, one of the controllers 53, 104, and/or 110 may trigger a charging cycle, thereby supplying the primary power from the main power supply 84 to the energy storage unit 54 needed a charge. In certain embodiments, the controllers 53 of the energy storage units 54 may communicate with one another, share monitored health information, respond to demands for powering the electrical actuators 70 to operate the subsea components 74, and agree on control actions (e.g., charging cycle to charge one or more energy storage units 54 and/or discharging cycle to provide power from one or more energy storage units 54 over the bus 52). However, any one or a combination of the controllers 110, 104, 53, and/or 75 may be used to provide for monitoring and control of the subsea system 10 and the subsea power system 50 using various control processes as discussed in further detail below.

The subsea power system 50 (e.g., power bus system) can take individual energy storage units 54 (e.g., batteries) and regulate the charging/discharging profile of each energy storage unit 54 (e.g., battery). The subsea power system 50 of the disclosure can "regulate" the electrical energy flow from and to energy storage units 54 (e.g., batteries) and to electric actuators 70. This might happen automatically or with user intervention. The energy storage units 54 (e.g., batteries) might be equipped with intelligent battery firmware, e.g., on controllers 53. In the case of a fault, the energy storage unit 54 (e.g., battery) can send a message to the subsea control module 100 and disables itself if necessary or execute any other pre-programmed algorithms. Any control and status message in relation to the subsea power system 50 might be sent via the subsea control module 100 to the topside control system 108 (e.g., master control station). It is possible to send individual comments from the topside control system 108 to each energy storage unit 54 (e.g., battery) to execute and monitor functions such as battery health, charging cycles, priorities within the grid, assignments between batteries and the electrical actuator(s) 70 they supply. Energy storage units 54 (e.g., batteries) can communicate with other energy storage units 54 (e.g., batteries) to determine identifier numbers and priorities. It is also useful to avoid cross-charging between energy storage units 54 (e.g., batteries). This function can be bypassed by the operator if necessary. In certain embodiments, the subsea power system 50 might be designed in a way that energy flow is only allowed from power supplies located in the subsea control module 100 to the energy storage units 54 (e.g., batteries), from energy storage units 54 (e.g., batteries) to electric actuators 70, from energy storage units 54 (e.g., batteries) to the subsea control module 100 electronic, and/or from energy storage units 54 (e.g., batteries) to subsea sensors 57. Energy flow from energy storage units 54 (e.g., batteries) to energy storage units 54 might be prevented in certain embodiments.

Figure 4:
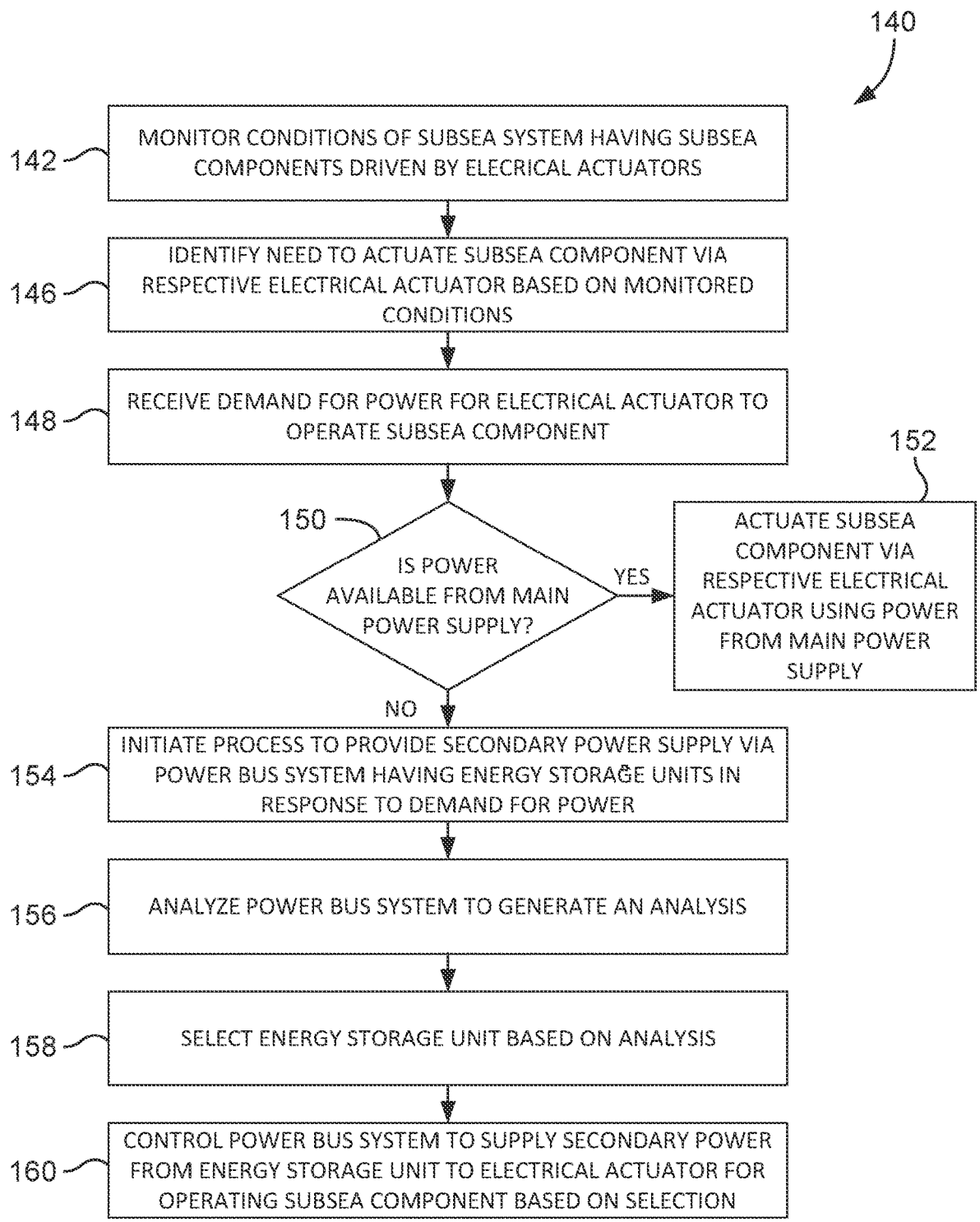
FIG. 4 is a flowchart of an example process for operating the subsea power system of FIG. 2, according to an embodiment of the present disclosure.

FIG. 4 is a flowchart of an example process 140 for operating the subsea power system 50 of FIG. 2, wherein the process 140 may be executed by one or more of the controllers 53, 56, 75, 104, and/or 110 as discussed above with reference to FIGS. 2-3. In block 142, conditions of a subsea system 10 having a plurality of subsea components 74 (e.g., valve, choke, etc.) driven by a plurality of electrical actuators 70 are monitored (e.g., by the one or more controllers). For example, one such condition may be the pressure of a fluid in one or more pipes of the subsea system 10. In certain embodiments, at least one of the plurality of subsea components 74 includes a valve.

In block 146, the one or more controllers identify a need to actuate at least one of the plurality of subsea components 74 via at least one of the plurality of electrical actuators 70 based on the monitored conditions. For example, if the pressure in a pipe meets or exceeds a threshold pressure, the one or more controllers may identify the need to open or shut one or more valves. In block 148, the one or more controllers receive a demand for power for at least one of the plurality of electrical actuators 70 to operate at least one of the plurality of subsea components 74. For example, factors including actuator size, pipe size, and/or amount of pressure may impact the power demanded needed to actuate the actuator. In block 150, the one or more controllers determine whether power is available from the main power supply 84. If power is available from the main power supply 84, the one or more controllers instruct(s) the at least one of the plurality of subsea components 74 to be actuated via at least one of the plurality of electrical actuators 70 using power from the main power supply 84 (e.g., power from electrical cables 12), as shown in block 152. If power from the main power supply 84 is unavailable, the one or more controllers initiate a process to provide power via the subsea power system 50 having the plurality of energy storage units 54, in response to the demand for power, as shown in block 154. For example, the one or more controllers may trigger a subroutine (e.g., function call(s), program(s), etc.) that enables the subsea power system 50 to begin powering at least one of the plurality of electrical actuators 70. In block 156, the one or more controllers analyze the subsea power system 50 to generate an analysis. For example, the one or more controllers may analyze and compare the amount of stored energy, position 55, number of previous discharge and charge cycles, expected remaining life, and/or voltage output of each of the plurality of energy storage units 54. Additionally, in block 156, the one or more controllers may analyze and compare the distance and expected power loss between each energy storage unit 54 (e.g., position 55) and each electrical actuator 70 needing power for operating a respective subsea component 74, and also analyze and compare the expected power that could reach the electrical actuator 70 from each energy storage unit 54. In block 158, the one or more controllers select at least one of the plurality of energy storage units 54 based on the analysis. In block 160, the one or more controllers control the subsea power system 50 to supply power from at least one of the plurality of energy storage units 54 to at least one of the plurality of electrical actuators 70 for operating at least one of the plurality of subsea components 74, based on the selection.

Figure 5:
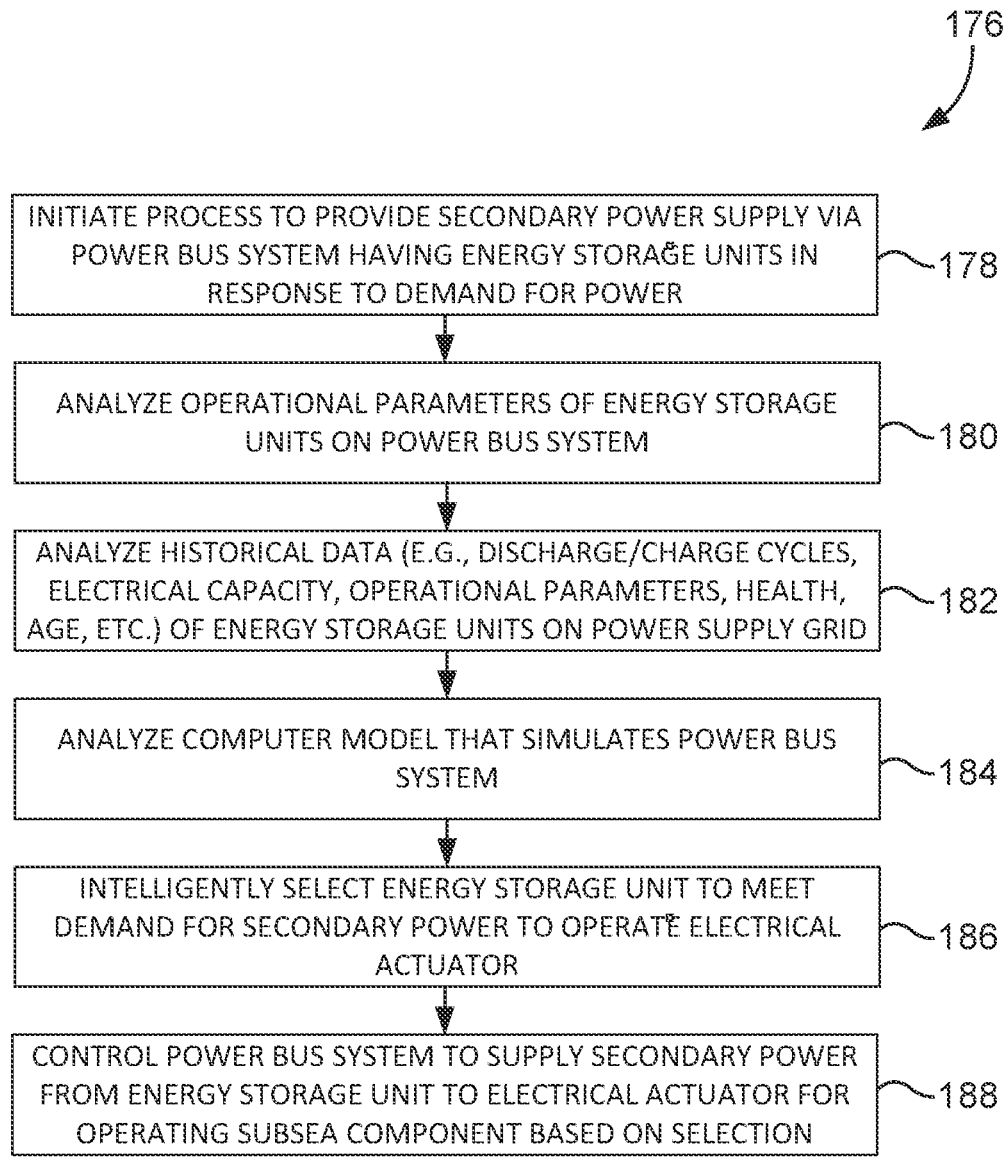
FIG. 5 is a flowchart of an example process for analyzing the subsea power system, according to an embodiment of the present disclosure.

FIG. 5 is a flowchart of an example process 176 for analyzing the subsea power system 50, wherein the process 176 may be executed by one or more of the controllers 53, 56, 75, 104, and/or 110 as discussed above with reference to FIGS. 2-3. In block 178, the one or more controllers initiate a process to provide power via the subsea power system 50 having the plurality of energy storage units 54, in response to the demand for power. For example, the one or more controllers may trigger a subroutine (e.g., function call(s), program(s), etc.) that enables the subsea power system 50 to begin powering the plurality of electrical actuators 70. In block 180, the one or more controllers analyze operational parameters of the plurality of energy storage units 54 on the subsea power system 50. For example, the one or more controllers may analyze one or more electrical properties (e.g., voltage output, current output, power output, impedance, etc.) of one or more of the plurality of energy storage units 54. Additionally, the one or more controllers may analyze distances and expected electrical losses between each of the energy storage units 54 and each of the electrical actuators 70 needed power for operating a respective subsea component 74, and expected power delivery to each of the electrical actuators 70 from each of the energy storage units 54. In block 182, the one or more controllers analyze historical data (e.g., charge/discharge cycles, electrical capacity, operational parameters, health, age, diagnostic data, service data, etc.) of the plurality of energy storage units 54 on the bus 52 of the subsea power system.

In block 184, the one or more controllers analyze a computer model that simulates the subsea power system 50. For example, the simulation of the subsea power system 50 may include simulated discharge cycles (e.g., distribution of power) from each energy storage unit 54 to each electrical actuator 70 on the bus 52, simulated charge cycles (e.g., receipt of power) from the main power supply 84 to each energy storage unit 54 on the bus 52, simulated impacts of distances (e.g., electrical losses and ultimate power delivered) from each energy storage unit 54 to each electrical actuator 70 on the bus 52, simulated impacts of charge and discharge cycles on the health, wear, and life of the energy storage units 54, simulated impacts of potential emergency conditions on the distribution of power from the energy storage units 54 to electrical actuators 70 based on various scenarios (e.g., power needed for electrical actuators 70 in different groups A, B, C, etc.), or any combination thereof. For example, the one or more controllers may analyze a simulation, algorithm, and/or optimization model (e.g., linear or non-linear program) of the subsea power system 50. In certain embodiments, the computer model may minimize an objective variable related to the plurality of energy storage units 54 (e.g., energy loss, efficiency, number of replacements, etc.). Additionally or alternatively, the computer model may be used to balance the electrical load, the number of discharge and charge cycles, and the overall health impact on the plurality of energy storage units 54 from the subsea components 74. Additionally or alternatively, the computer model may be used to simulate a staggering of the electrical load, the number of discharge and charge cycles, and the overall health impact on the plurality of energy storage units 54 from the subsea components 74, thereby enabling a staggered replacement of the energy storage units 54 at different times in the future.

In block 186, the one or more controllers intelligently select at least one of the plurality of energy storage units 54 to meet the demand for power to operate the at least one of the plurality of electrical actuators 70. The intelligent selection may be based on the analysis (block 180), the analysis (block 182), the analysis (block 184), and/or an additional analysis of the subsea power system 50. In block 188, the one or more controllers control the subsea power system 50 to supply power from at least one of the plurality of energy storage units 54 to the at least one of the plurality of electrical actuators 70 for operating at least one of the plurality of subsea components 74 based on the selection of the at least one of the plurality of electrical actuators 70. In certain embodiments, the one or more controllers may also intelligently select (e.g., concurrently) a second energy storage unit of the plurality of energy storage units 54 for a charge cycle based on the analysis. While the present embodiment discloses the one or more controllers analyzing operational parameters, historical data, and/or a computer model, it should be understood that the one or more controllers may analyze a combination of these factors and/or additional factors.

Figure 6:
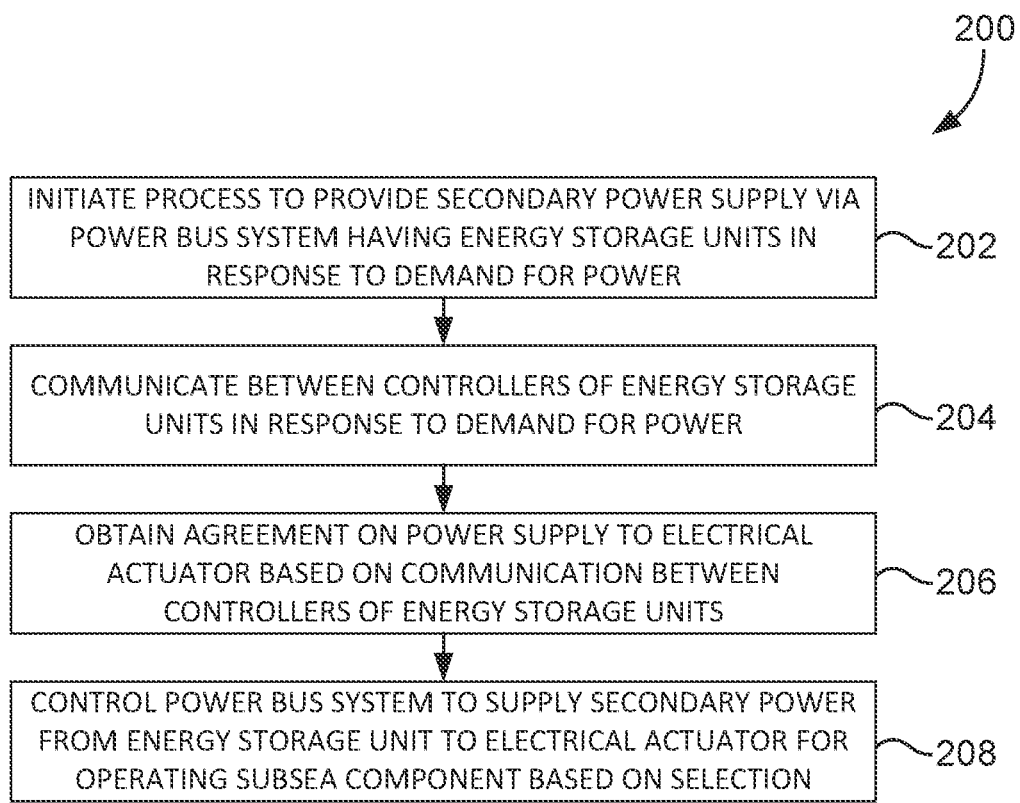
FIG. 6 is a flowchart of an example process for decentralized control of the subsea power system, according to an embodiment of the present disclosure.

FIG. 6 is a flowchart of an example process 200 for decentralized control of the subsea power system 50, wherein the process 200 may be executed by one or more of the controllers 53, 56, 75, 104, and/or 110 as discussed above with reference to FIGS. 2-3. In block 202, the one or more controllers initiate a process to provide power via the subsea power system 50 having the plurality of energy storage units 54, in response to a demand for power for operating one or more electrical actuators 70 to actuator respective subsea components 74. For example, the one or more controllers may trigger a subroutine (e.g., function call(s), program(s), etc.) that enables the subsea power system 50 to begin powering the plurality of electrical actuators 70 for closing or opening valves of the subsea components 74. In block 204, the one or more controllers 53 of the energy storage units 54 communicate with each other (e.g., via a unique identifier assigned to each controller 53) in response to the demand for power. In block 206, an agreement on the supply of power to the at least one of the plurality of electrical actuators 70 is made, based on the communication between the one or more controllers of each of the plurality of energy storage units 54. In certain embodiments, each energy storage unit of the plurality of energy storage units 54 may be equipped with its own controller 53 having a processor, memory, instructions stored on the memory and executable by the processor to perform an analysis and obtain the agreement (block 206), and communication circuitry configured to communicate with one another and other controllers. For example, the controllers 53 may evaluate the energy demand, distance and electrical losses between each energy storage unit 54 and the electrical actuator 70 demanding power, the health of the energy storage units 54, or any combination thereof, to determine one or more best options for selecting an energy storage unit 54, and ultimately agree on one of the energy storage units 54 to supply secondary power to the electrical actuator 70 demanding power. In block 208, the one or more controllers control the subsea power system 50 to supply power from at least one of the plurality of energy storage units 54 to the at least one of the plurality of electrical actuators 70 for operating at least one of the plurality of subsea components 74 based on the selection of the at least one of the plurality of electrical actuators 70. In certain embodiments, the subsea power system 50 may be switched (e.g., via a user interface) between centralized control and decentralized control. In other embodiments, centralized control, decentralized control, or a combination thereof may be employed by the controller.

Figure 7:
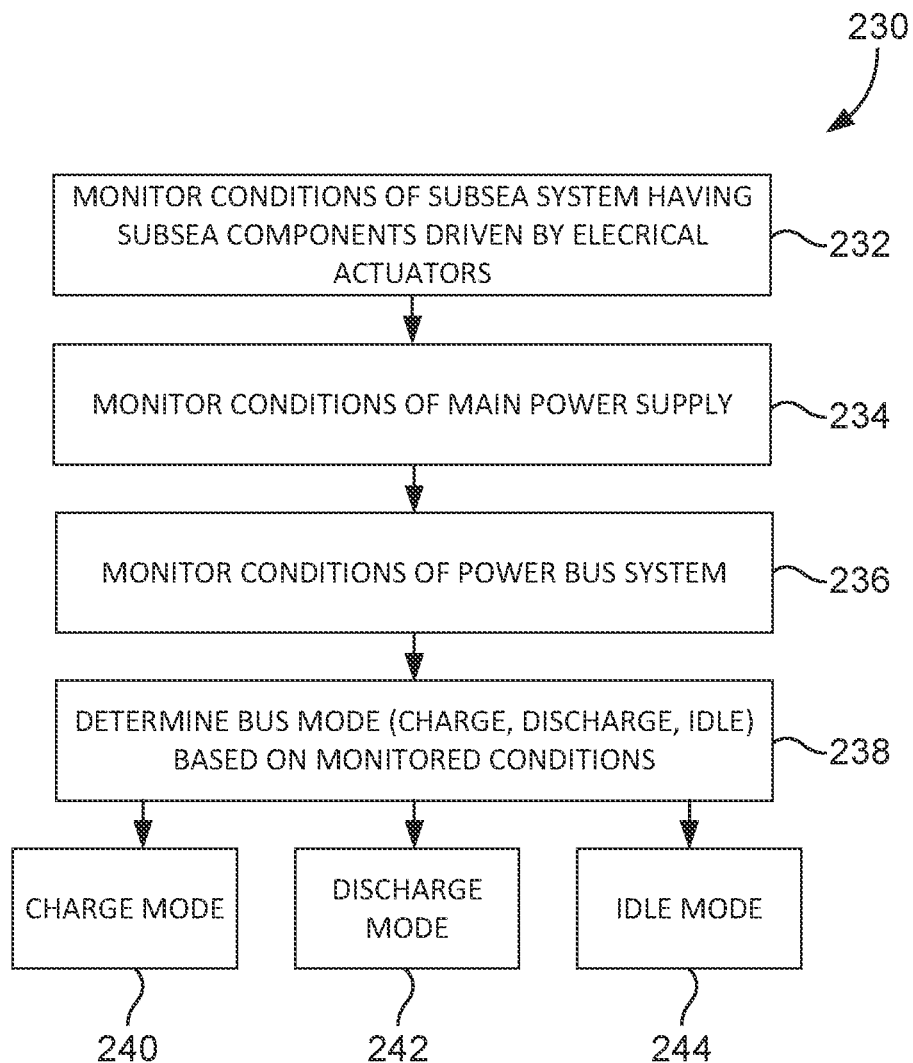
FIG. 7 is a flowchart of an example process for selecting a mode for the subsea power system, according to an embodiment of the present disclosure.

FIG. 7 is a flowchart of an example process 230 for selecting a mode for the subsea power system 50, wherein the process 230 may be executed by one or more of the controllers 53, 56, 75, 104, and/or 110 as discussed above with reference to FIGS. 2-3. In block 232, one or more controllers monitor conditions of the subsea system 10 having a plurality of subsea components 74 (e.g., valve, pump, fluid injection system, etc.) driven by a plurality of electrical actuators 70. For example, the monitored conditions may include a pressure, a flow rate, a fluid composition, a moisture content, a temperature, or any combination thereof, of a fluid in one or more pipes and/or fluid passages of the subsea system 10. By further example, the monitored conditions may include one or more events triggering a need for actuating one or more of the subsea components 74 via the respective electrical actuator 70, and thus the monitored condition indicates a need for power. In block 234, the one or more controllers monitor conditions of the main power supply 84. For example, the one or more controllers may monitor whether the main power supply 84 is active and whether sufficient power is being generated by the main power supply 84 to actuate the plurality of electrical actuators 70, or whether the main power supply 84 is inactive or unavailable. In block 236, the one or more controllers monitor conditions of the subsea power system 50. For example, the one or more controllers may monitor an energy capacity, a current charge stage, a health, a number of discharge and charge cycles, a fault or error history, a diagnostic data, a service data, or any combination thereof, of the plurality of energy storage units 54.

In block 238, the one or more controllers selectively determine a bus mode based on the monitored conditions (blocks 232, 234, and 236). In response to determining the bus mode, the one or more controllers selectively operate the subsea power system 50 in a charge mode (block 240), a discharge mode (block 242), or an idle mode (block 244). In certain embodiments, the one or more controllers may assign one of the three aforementioned modes to each of the plurality of energy storage units 54 (e.g., any two energy storage units may have a different mode), based on conditions of each of the plurality of energy storage units 54 (e.g., insufficient stored energy). In certain embodiments, the one or more controllers may block the subsea power system 50 from entering discharge mode based on the conditions of the main power supply 84 (e.g., main power supply 84 is active). In other embodiments, the one or more controllers may switch the subsea power system 50 to charge mode based on the conditions of subsea power system 50 (e.g., insufficient energy stored in the plurality of energy storage units 54). The modes 240, 242, and 244 are discussed in detail below with reference to FIGS. 8, 9, and 10.

Figure 8:
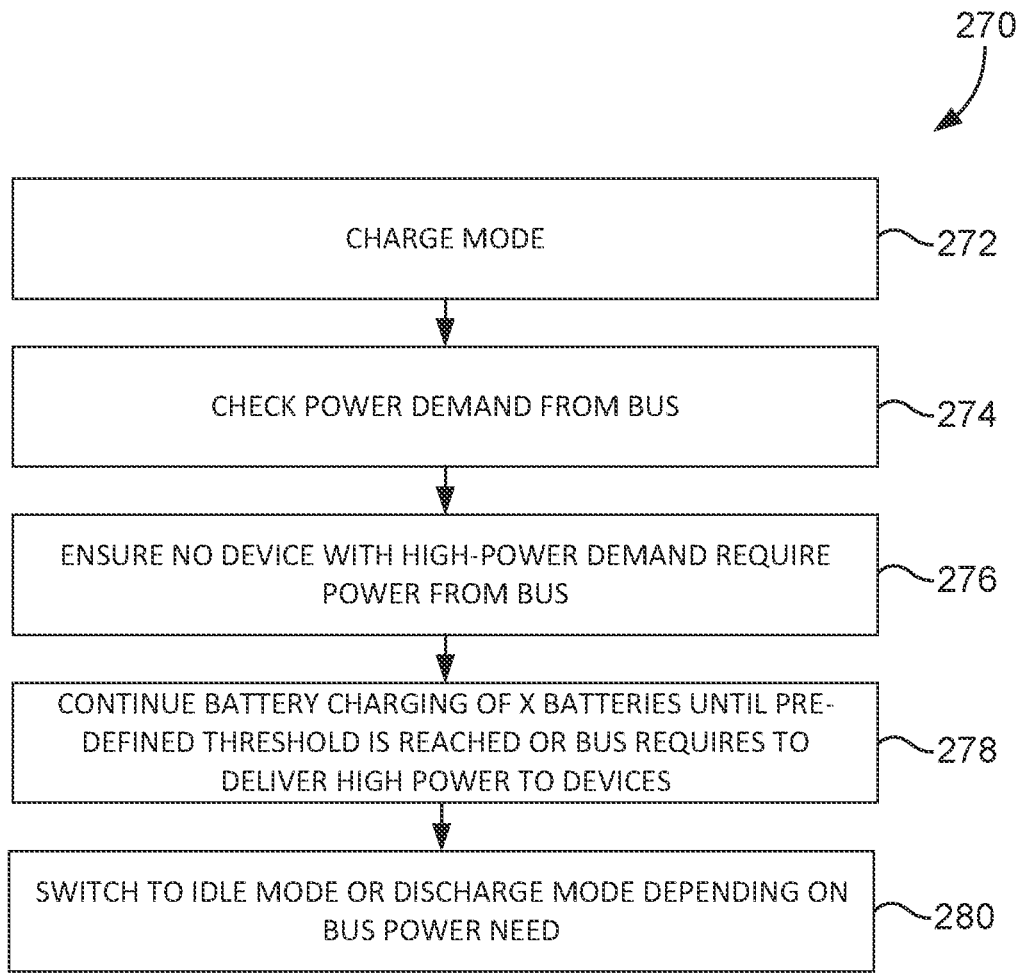
FIG. 8 is flowchart of an example process for executing a charge mode on the subsea power system, according to an embodiment of the present disclosure.

FIG. 8 is flowchart of an example process 270 for executing a charge mode 240 on the subsea power system 50, wherein the process 270 may be executed by one or more of the controllers 53, 56, 75, 104, and/or 110 as discussed above with reference to FIGS. 2-3. In block 272, the one or more controllers selectively operate the subsea power system 50 in the charge mode 240 when the main power supply 84 is available to provide primary power and one or more of the energy storage units 54 is selected for charging based on a current level of charge. In block 274, the one or more controllers check the power demand from the bus 52. For example, the one or more controllers may block the subsea power system 50 from entering charge mode 240 if there is a demand for energy from the bus 52 (e.g., demand for power from the energy storage units 54 to power the electrical actuators 70, sensors, or other subsea components 74), so that concurrent charging and discharging of the plurality of energy storage units 54 does not occur. In block 276, the one or more controllers ensure that there are no devices with a power demand (e.g., electrical actuators 70) above a threshold power that could use power from the bus 52. For example, the one or more controllers may evaluate specification data regarding the number of energy storage units 54 and/or electrical power used by each of the plurality of subsea components 74. If a particular subsea component of the plurality of subsea components 74 uses a threshold number of energy storage units 54 and/or electrical power to meet its power demand, then the one or more controllers may block the particular subsea component 74 from receiving power if not needed for operation of the subsea system 10 and/or the one or more controllers may block or stop operation in the charge mode 240. In block 278, the one or more controllers continue charging of one or more of the plurality of energy storage units 54 (e.g., batteries) until a predefined threshold of stored energy is reached for the energy storage units 54 or the bus 52 is demanded to deliver power to one or more subsea components 74. For example, in response to receiving a power demand from at least one of the plurality of subsea components 74, the one or more controllers may temporarily block or stop the subsea power system 50 from operating in the charge mode 240. In block 280, the one or more controllers switch the subsea power system 50 to an idle mode 244 or a discharge mode 242 depending on power needed by bus 52. In certain embodiments, the one or more controllers switch the subsea power system 50 to the idle mode 244 after a predetermined elapsed time of the plurality of energy storage units 54 remaining fully charged and no power demands being received on the subsea power system 50.

Figure 9:
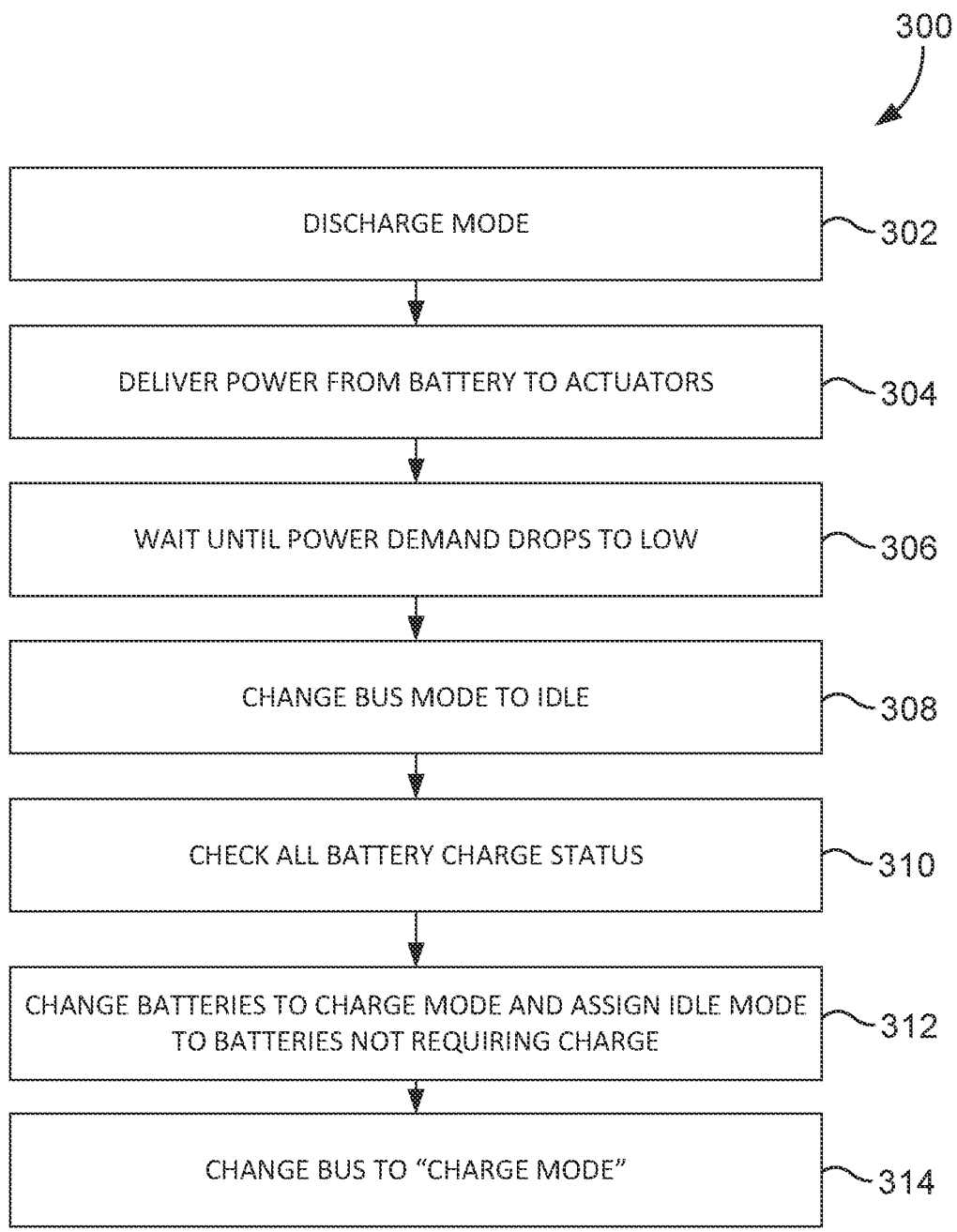
FIG. 9 is a flowchart of an example process for executing a discharge mode on the subsea power system, according to an embodiment of the present disclosure.

FIG. 9 is a flowchart of an example process 300 for executing a discharge mode 242 on the subsea power system 50, wherein the process 300 may be executed by one or more of the controllers 53, 56, 75, 104, and/or 110 as discussed above with reference to FIGS. 2-3. In block 302, the one or more controllers selectively operate the subsea power system 50 in the discharge mode 242. In block 304, the one or more controllers cause power to be delivered from at least one of the energy storage units 54 (e.g., batteries) to at least one of the electrical actuators 70. For example, the one or more controllers (e.g., 110,104) may send a signal to the controller 53 of at least one of the energy storage units 54 to cause at least one of the energy storage units 54 to discharge energy over the bus 52 to one or more electrical actuators 70 demanding power to operate respective subsea components 74. In block 306, the one or more controllers wait until the power demand from the subsea component 74 drops below a predetermined threshold level of power (e.g., rate of power usage drops below a threshold). In certain embodiments, the one or more controllers may keep the subsea power system 50 in discharge mode 302 until the stored energy of one or more of the plurality of energy storage units 54 drops below 20 percent of full charge and/or the rate of decline in the stored energy drops below a threshold rate.

In block 308, the one or more controllers change the mode of the bus 52 to idle mode. In block 310, the one or more controllers check the charge status of the plurality of energy storage units 54 (e.g., batteries). For example, the one or more controllers may receive a signal from the controller 53 of each energy storage units 54 indicative of an amount of stored energy in the respective energy storage unit 54 (e.g., a current charge state, such as 10, 20, 30, 40, 50, 60, 70, 80, 90, or 100 percent charged). In block 312, the one or more controllers change at least one of the energy storage units 54 (e.g., batteries) to a charge mode 240 if additional charge is needed based on the charge state, and assign an idle mode 244 to at least one of the energy storage units 54 not needing an additional charge. For example, the one or more controllers may compare the current stored energy of each of the plurality of energy storage units 54. If the current stored energy of at least one of the energy storage units 54 falls below a minimal threshold, the controller(s) may place the respective energy storage units 54 into the charge mode 240. In block 314, the one or more controllers change the bus 52 to charge mode.

Figure 10:
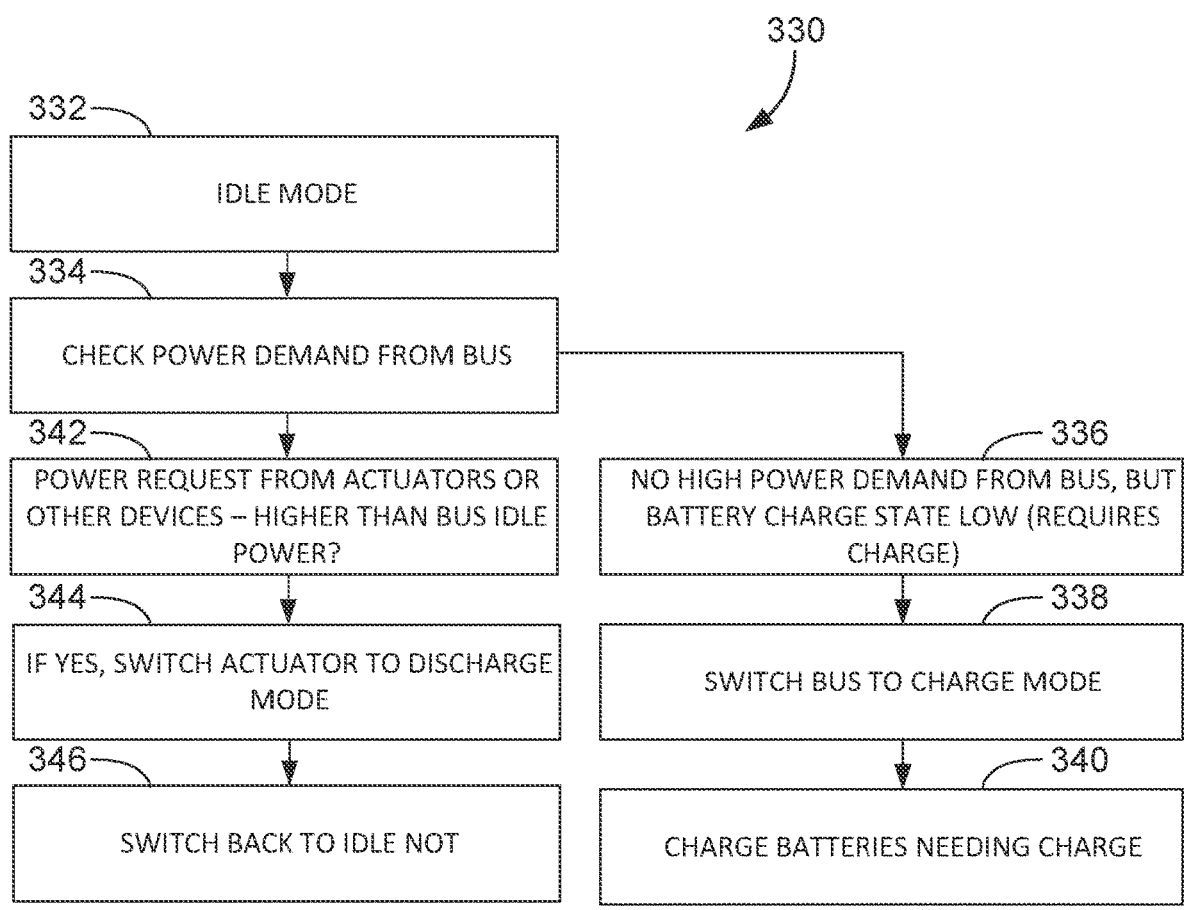
FIG. 10 is a flowchart of an example process for executing an idle mode on the subsea power system, according to an embodiment of the present disclosure.

FIG. 10 is a flowchart of an example process 330 for executing an idle mode 244 on the subsea power system 50, wherein the process 330 may be executed by one or more of the controllers 53, 56, 75, 104, and/or 110 as discussed above with reference to FIGS. 2-3. In block 332, the one or more controllers selectively operate the subsea power system 50 in the idle mode 244. In block 334, the one or more controllers determine whether the power demand from the bus 52 is at or below a predetermined threshold (e.g., an idle power demand threshold). For example, the predetermined threshold may be set at a level below a lowest expected power demand by the electrical actuators 70 on the bus 52. If the power demand from the bus 52 does not exceed the predetermined threshold, then the one or more controllers determine whether the charge state of the plurality of energy storage units 54 (e.g., batteries) is below a predetermined level of charge (block 336). If the charge state of the plurality of energy storage units 54 is below the predetermined threshold of charge, then the one or more controllers switch the bus 52 to a charge mode 240 (block 338). In block 340, the one or more controllers charge each of the plurality of energy storage units 54 that need charging. In certain embodiments, two or more thresholds of charge (e.g., 25% charged, 50% charged, etc.) may be used by the one or more controllers to prioritize charging of the plurality of energy storage units 54, such as by charging the energy storage units 54 in an order from lowest to highest thresholds of charge.

If the power demand from the bus 52 does exceed the predetermined threshold (e.g., an idle power demand threshold) (block 342), then the one or more controllers determine whether the amount of power requested by at least one of the electrical actuators 70 is higher than the power used by the respective electrical actuators 70 while the bus 52 is in the idle mode 244 (block 342). For example, the one or more controllers may compare the power demand of the electrical actuators 70 with the amount of power provided by the main power supply 84 (e.g., no discharge from energy storage units while in idle mode). If the amount of power requested by the at least one of the electrical actuators 70 is indeed higher, then the one or more controllers switch one or more energy storage units 54 to the discharge mode 242, as shown in block 344. In block 346, the one or more controllers switch the bus 52 back to the idle mode 244. In certain embodiments, all energy storage units 54 may be concurrently placed in charge mode 240 or discharge mode 242, but not both, so as to avoid cross-charging between individual energy storage units. However, the process 330 may include a variety of control schemes to handle the charge mode 240 and the discharge mode 242.

Figure 11:
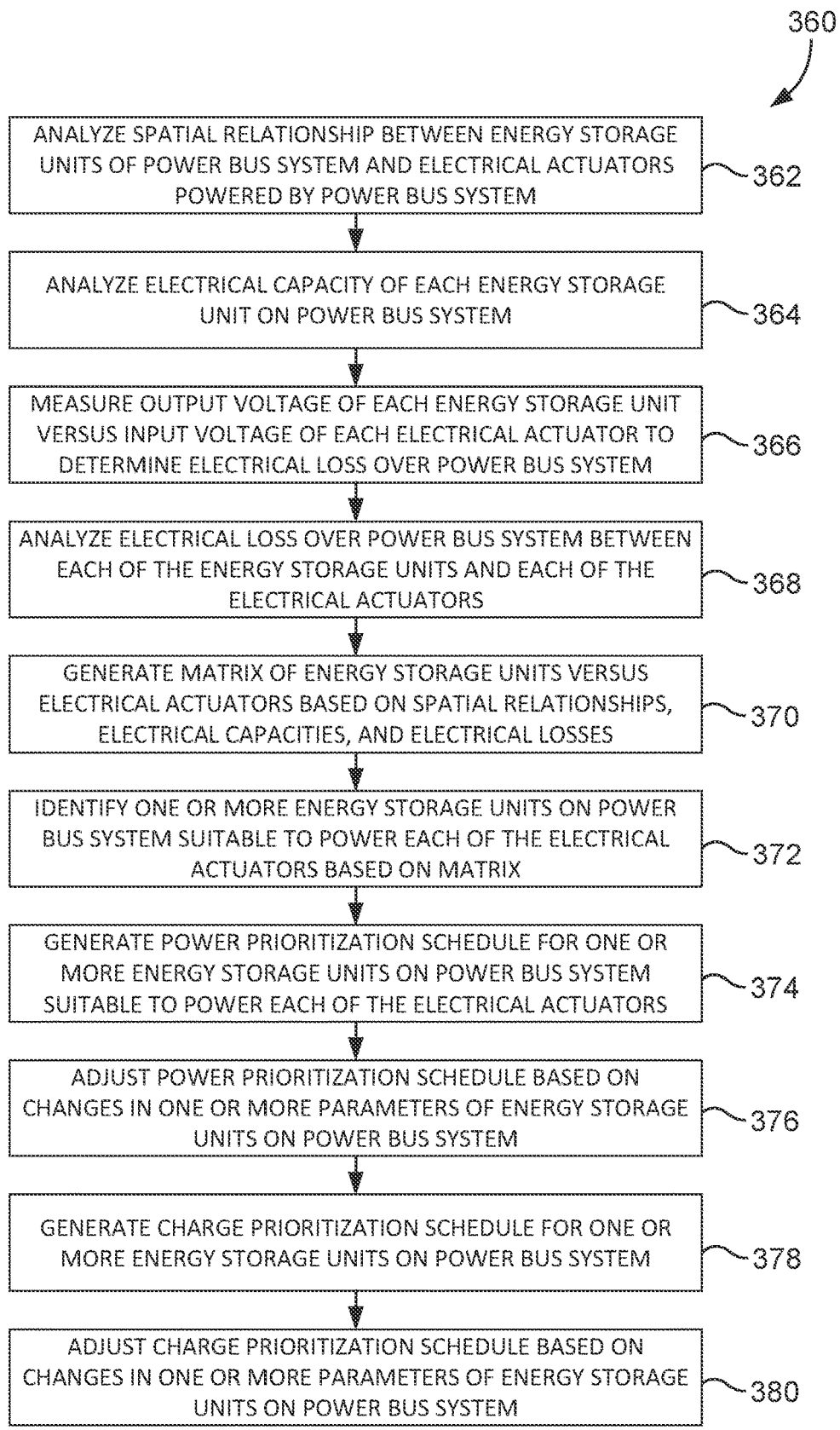
FIG. 11 is a flowchart of an example process for generating power and charge prioritization schedules for the subsea power system, according to an embodiment of the present disclosure.

FIG. 11 is a flowchart of an example process 360 for generating power and charge prioritization schedules for the subsea power system 50, wherein the process 360 may be executed by one or more of the controllers 53, 56, 75, 104, and/or 110 as discussed above with reference to FIGS. 2-3. In block 362, the one or more controllers analyze a spatial relationship between the plurality of energy storage units 54 of the subsea power system 50 and the plurality of electrical actuators 70 powered by the subsea power system 50. For example, the one or more controllers may determine a geospatial distance between each of the plurality of energy storage units 54 and each of the plurality of electrical actuators 70, and select particular energy storage units 54 to power each of the plurality of electrical actuators 70 to minimize a geospatial variable (e.g., distance, total distance, etc.). In block 364, the one or more controllers analyze the electrical capacity (e.g., total electrical capacity when fully charged, and current capacity based on a current charge stage) of each of the plurality of energy storage units 54 on the subsea power system 50. In block 366, the one or more controllers measure the output voltage of each of the plurality of energy storage units 54 and the input voltage of each of the plurality of electrical actuators 70 to determine the electrical loss over the subsea power system 50. For example, the one or more controllers may determine the electrical loss by taking the difference between the output voltage of each of the plurality of energy storage units 54 and the input voltage of each of the plurality of electrical actuators 70. In block 368, the one or more controllers analyze the electrical loss over the subsea power system 50, specifically between each of the plurality of energy storage units 54 and each of the plurality of electrical actuators 70. In block 370, the one or more controllers generate a matrix based on the plurality of energy storage units 54 and the plurality of electrical actuators 70 based on the spatial relationships, electrical capacities, and electrical losses. For example, if there are n energy storage units and m electrical actuators used in the subsea power system 50, then an n×m matrix may be generated with information for each pair of an energy storage unit 54 and a respective electrical actuator 70. The information may include the relative distances, the electric losses, and the expected power to be delivered between each pair of an energy storage unit 54 and a respective electrical actuator 70. The information also may indicate whether each pair of an energy storage unit 54 and a respective electrical actuator 70 is acceptable or unacceptable to power the respective actuator 70 based on minimum thresholds and/or thresholds with a suitable factor of safety. In certain embodiments, different weights may be given to different factors (e.g., spatial distance, electrical loss, etc.) depending on the importance of each variable. In certain embodiments, an optimization algorithm may be used by the one or more controllers to determine an optimal assignment of each of the plurality of energy storage units 54 to each of the plurality of electrical actuators 70. In block 372, the one or more controllers identify one or more of the energy storage units 54 on the subsea power system 50 suitable to power each of the plurality of electrical actuators 70, based on the matrix. For example, the matrix may be used to minimize an objective variable, or a shortest path algorithm (e.g., Djikstra's, Prims, etc.) may be used along with the matrix. It should be understood that other factors in addition to the aforementioned factors may be used to generate the aforementioned matrix.

In block 374, the one or more controllers generate a power prioritization schedule for one or more of the energy storage units 54 on the subsea power system 50, suitable to power each of the plurality of electrical actuators 70. For example, the one or more controllers may prioritize one or more of the plurality of electrical actuators 70 regarding importance in operating the subsea system 10, responding to emergency conditions, or other factors. By further example, the one or more controllers may prioritize one or more of the energy storage units 54 for use in providing power to each of the plurality of electrical actuators 70, such as by prioritizing the energy storage units 54 from closest to furthest distance from the respective electrical actuator 70, from highest to lowest charge state, from lowest to highest number of discharge and charge cycles, from highest to lowest health, or any combination thereof. In block 376, the one or more controllers adjust the power prioritization schedule based on changes in one or more parameters of the plurality of energy storage units 54 on the subsea power system 50. For example, if the energy storage units 54 experience changes in health, changes in charge stage, changes in diagnostic or service data, changes in error/fault codes, replacements with new energy storage units 54, or any combination thereof, then the one or more controllers may change the prioritization schedule to account for the new information. For example, an increase in age and/or health of one or more of the plurality of energy storage units 54 may cause the output voltage to decrease. The controller(s) may adjust the power prioritization schedule based on the change in output voltage.

In block 378, the controller(s) generate a charge prioritization schedule for one or more of the plurality of energy storage units 54 on the subsea power system 50. For example, the one or more controllers may prioritize one or more of the energy storage units 54 for charging based on one or more parameters (e.g., health, age, output voltage, current charge stage, number of previous discharge and charge cycles, position on the bus 52, number of electrical actuators 70 in close proximity to the energy storage unit 54, etc.) of each of the energy storage units 54. In block 380, the one or more controllers adjust the charge prioritization schedule based on changes in one or more parameters of the energy storage units 54 on the subsea power system 50. For example, if the energy storage units 54 experience changes in health, changes in charge stage, changes in diagnostic or service data, changes in error/fault codes, replacements with new energy storage units 54, or any combination thereof, then the one or more controllers may change the prioritization schedule to account for the new information. For example, an increase in age and/or health of one or more of the plurality of energy storage units 54 may cause the output voltage to decrease. The one or more controllers may adjust the charge prioritization schedule based on the change in output voltage. In certain embodiments, the one or more controllers may generate a power prioritization schedule, a charge prioritization schedule, or a combination thereof. In certain embodiments, a change in either of the prioritization schedules may be used by the one or more controllers to change the other of the prioritization schedules.

Figure 12:
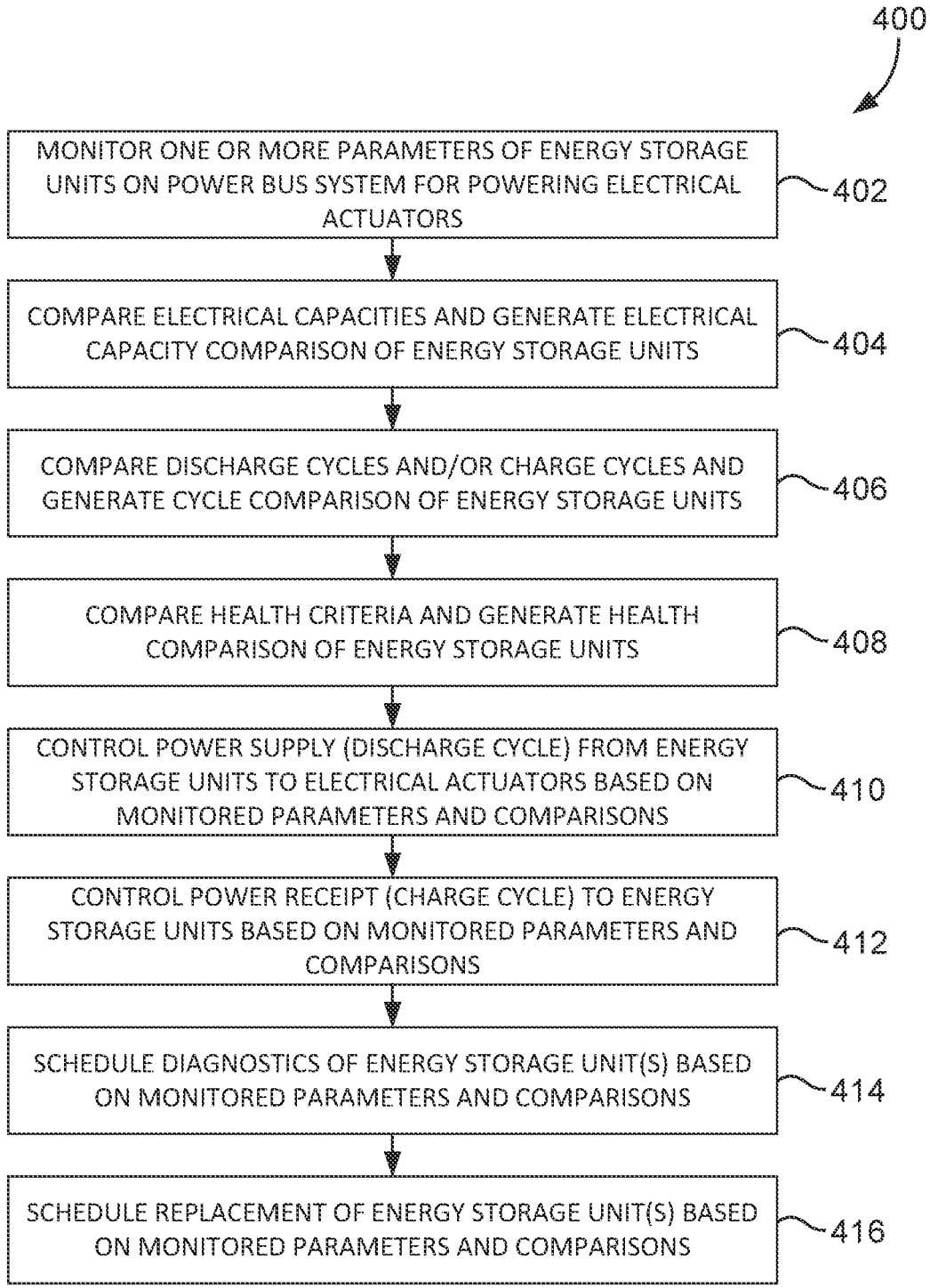
FIG. 12 is a flowchart of an example process for conducting general diagnostics of the subsea power system, according to an embodiment of the present disclosure.

FIG. 12 is a flowchart of an example process 400 for conducting general diagnostics of the subsea power system 50, wherein the process 400 may be executed by one or more of the controllers 53, 56, 75, 104, and/or 110 as discussed above with reference to FIGS. 2-3. In block 402, the one or more controllers monitor one or more parameters of the energy storage units 54 on the subsea power system 50 for powering the plurality of electrical actuators 70. In block 404, the one or more controllers compare the electrical capacities of each of the plurality of energy storage units 54 and generate a comparison of the electrical capacities (e.g., total electrical capacities when fully charged, current electrical capacities based on current charge levels, etc.). In block 406, the one or more controllers compare the discharge cycles and/or charge cycles of the energy storage units 54 to generate a cycle comparison of the energy storage units 54. For example, the one or more controllers may compare the number of discharge cycles and/or charge cycles, the duration of discharge cycles and/or charge cycles, and/or the frequency of discharge cycles and/or charge cycles for each of the plurality of energy storage units 54. In block 408, the one or more controllers compare health criteria of each of the plurality of energy storage units 54 and generate a comparison of the health criteria. For example, the one or more controllers may monitor how quickly the output voltage of each of the plurality of energy storage units 54 decreases over time, such as during an idle mode. In certain embodiments, the one or more controllers may compare electrical capacities of each of the energy storage units 54, discharge/charge cycles of each of the energy storage units 54, health criteria of each of the energy storage units 54, or a combination thereof, and generate the respective comparisons. In certain embodiments, the one or more controllers may selectively discharge one or more of the energy storage units 54 based on the monitored parameter(s) and the one or more comparisons. In other embodiments, the one or more controllers may selectively charge one or more of the energy storage units 54 based on the monitored parameter(s) and the one or more comparisons.

In block 410, the one or more controllers control the supply of power (e.g., discharge cycle) from one or more of the energy storage units 54 based on the monitored parameters and comparisons. For example, the one or more controllers may selectively assign or reassign one or more of the energy storage units 54 to each of the electrical actuators 70 based on the health criteria of the energy storage units 54. More specifically, one or more of the energy storage units 54 of lower health may be assigned to one or more of the electrical actuators 70 with lower priority (e.g., less essential), whereas one or more of the energy storage units 54 of greater health may be assigned to one or more of the electrical actuators 70 with higher priority (e.g., more essential and/or critical).

In block 412, the one or more controllers control power receipt (e.g., charge cycle) to the energy storage units 54 based on the monitored parameters and comparisons. For example, the one or more controllers may selectively assign or reassign one or more of the energy storage units 54 to be charged earlier based on the health criteria of the energy storage units 54. More specifically, one or more of the energy storage units 54 of higher health may be assigned to enter a charge cycle prior to those of lower health.

In block 414, the one or more controllers schedule diagnostics of one or more of the energy storage units 54 based on the monitored parameters and comparisons. For example, the one or more controllers may schedule more frequent diagnostic routines for one or more of the energy storage units 54 that indicate lower health and/or greater elapsed time since a previous diagnostic routine. In block 416, the one or more controllers schedule replacement of one or more of the energy storage units 54 based on the monitored parameters and comparisons. For example, the one or more controllers may schedule an upcoming replacement one or more of the plurality of energy storage units 54 that indicate lower health. In certain embodiments, the one or more controllers may schedule diagnostics of one or more of the plurality of energy storage units 54, schedule replacement of one or more of the plurality of energy storage units 54, or a combination thereof.

Figure 13:
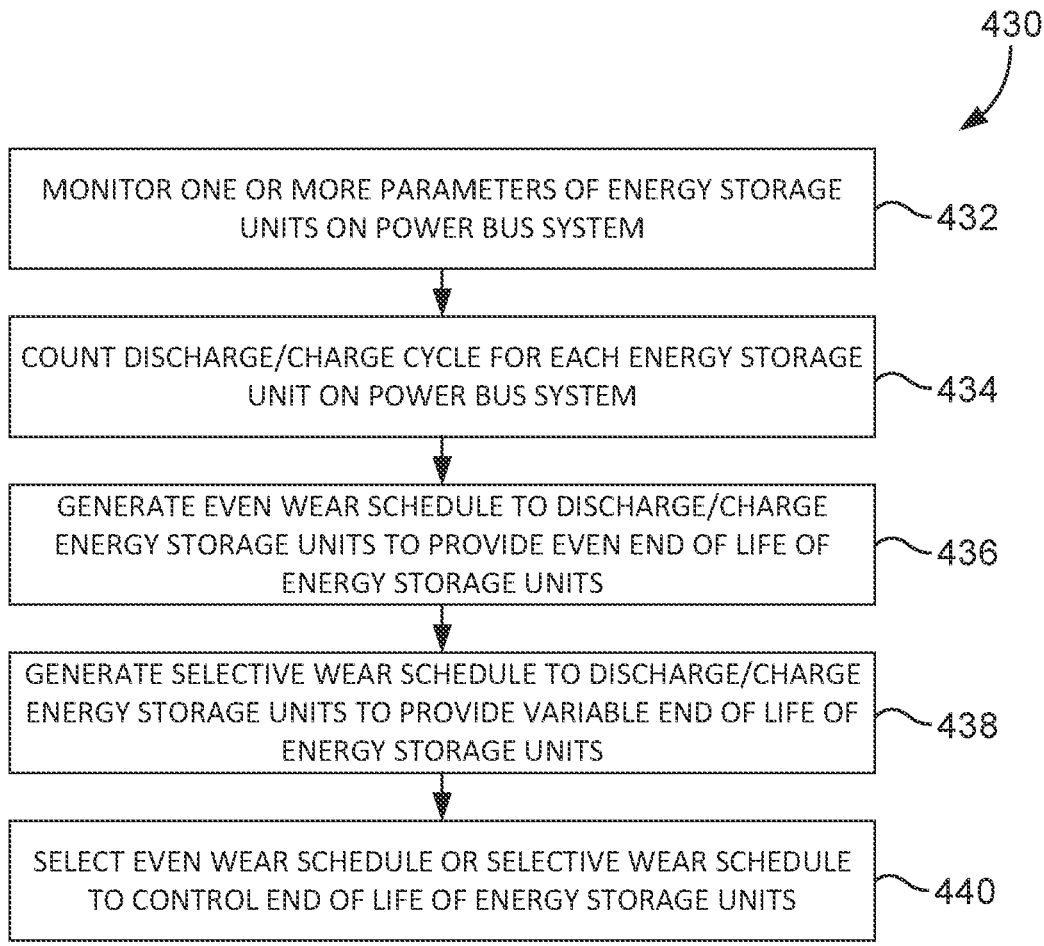
FIG. 13 is a flowchart of an example process for generating a wear schedule of one or more energy storage units of the subsea power system, according to an embodiment of the present disclosure.

FIG. 13 is a flowchart of an example process 430 for generating a wear schedule of one or more of the plurality of energy storage units 54 of the subsea power system 50, wherein the process 430 may be executed by one or more of the controllers 53, 56, 75, 104, and/or 110 as discussed above with reference to FIGS. 2-3. In block 432, the one or more controllers monitor one or more parameters of the plurality of energy storage units 54 on the subsea power system 50. In block 434, the one or more controllers count the number of discharge and/or charge cycles for each of the energy storage units 54 on the subsea power system 50. For example, the one or more controllers may include one or more counters that increment for each discharge and/or charge cycle of the energy storage units 54. In block 436, the one or more controllers generate an even wear schedule to discharge and/or charge the energy storage units 54 to provide an even end of life for the plurality of energy storage units 54. For example, in an even end of life control mode, the one or more controllers may control the subsea power system 50 to use each of the energy storage units 54 for various electrical actuators 70 demanding power (e.g., discharge cycle) an equal number of times prior to using a particular energy storage unit 54 for another discharge cycle (e.g., all energy storage units 54 are discharged once, then twice, and so on). By further example, the one or more controllers may place each of the plurality of energy storage units 54 in a charge cycle sequentially, such that the lifetime of each of the energy storage units 54 falls within a predetermined window of time (e.g., all energy storage units need to be replaced within a year of each other). In block 438, the one or more controllers generate a selective wear schedule to discharge and/or charge the plurality of energy storage units 54 to provide a variable end of life of the plurality of energy storage units 54. For example, in a variable end of life control mode, the one or more controllers may stagger the discharge and/or charge cycles of the plurality of energy storage units 54 by dividing the plurality of energy storage units 54 into two or more staggered groups. More specifically, one group of the plurality of energy storage units 54 may be charged and/or discharged while the other group(s) of the plurality of energy storage units 54 remain idle.

In block 440, the one or more controllers select either the even wear schedule or the selective wear schedule to control the end of life of the plurality of energy storage units 54. In certain embodiments, an operator may be enabled (e.g., via a user interface) to select the wear schedule (e.g., uniform wear, staggered wear, etc.) of the energy storage units 54. It should be understood that other wear schedules in addition to the aforementioned staggered and even wear scheduled may be scheduled and/or selected by the one or more controllers. In certain embodiments, the one or more controllers may select a combination of the even wear schedule and the staggered wear schedule.

Figure 14:
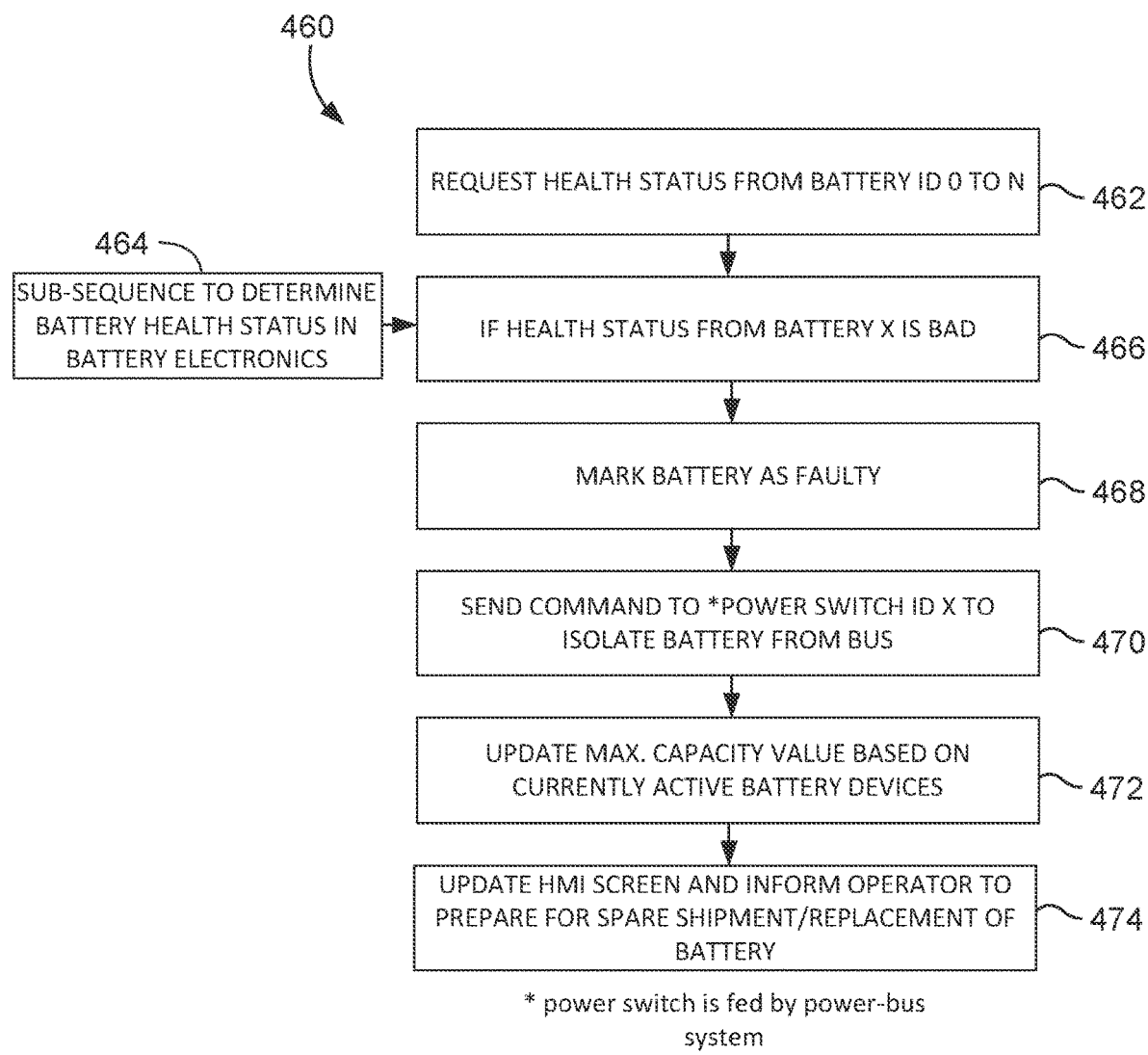
FIG. 14 is a flowchart of an example process for isolating a faulty energy storage unit of the subsea power system, according to an embodiment of the present disclosure.

FIG. 14 is a flowchart of an example process 460 for isolating a faulty energy storage unit of the plurality of energy storage units 54 of the subsea power system 50, wherein the process 460 may be executed by one or more of the controllers 53, 56, 75, 104, and/or 110 as discussed above with reference to FIGS. 2-3. In block 462, the one or more controllers request the health status of each of the energy storage units 54. In block 464, the one or more controllers perform a subroutine to determine the health of each of the energy storage units 54. For example, the one or more controllers may receive a signal from each of the plurality of energy storage units 54, which indicates the status and/or errors associated with each of the energy storage units 54. In block 466, for each of the energy storage units 54 that is of poor health, the one or more controllers mark at least one of the energy storage units 54 as faulty (block 468). In block 470, the one or more controllers send a command to a power switch of each of the energy storage units 54 that was marked faulty to isolate the faulty energy storage units from the bus 52. For example, the power switch may utilize an electronics component (e.g., contactor, relay) to isolate the one or more faulty energy storage units 54 from the bus 52. In block 472, the one or more controllers update the maximum capacity value of the subsea power system 50 based on the currently active energy storage units 54. For example, in response to isolating one or more faulty energy storage units 54, the one or more controllers may decrease the recorded total energy capacity of the energy storage units 54 according to the number of energy storage units 54 that were isolated. In block 474, the one or more controllers update a human machine interface (HMI) screen and inform an operator to prepare for replacement of the faulty energy storage units 54.

It should be understood by the reader that the controller(s) (e.g., controllers 53, 56, 75, 104, and/or 110) of the subsea power system 50 may be configured to execute additional processes not explicitly disclosed in FIGS. 2-14. Additionally, it should be understood by the reader that the controller(s) of the subsea power system 50 may be configured to execute any combination of the processes described in FIGS. 2-14.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112 (f). However, for any claims containing elements designated in any other manner, it is intended that such elements are not to be interpreted under 35 U.S.C. § 112 (f).

What is claimed is:
1. A system, comprising:
 a subsea power system, comprising:
  a bus;

a plurality of energy storage units coupled to the bus at a plurality of positions distributed throughout the subsea power system; and a controller comprising a memory, a processor, and instructions stored on the memory and executable by the processor to control the subsea power system to:

analyze a spatial relationship between the plurality of energy storage units and a plurality of electrical actuators;

analyze an electrical capacity of the plurality of energy storage units;

analyze an electrical loss over the bus between each of the plurality of energy storage units and each of the plurality of electrical actuators;

selectively discharge a first energy storage unit of the plurality of energy storage units over the bus to supply power to a first electrical actuator of the plurality of electrical actuators; and selectively charge a second energy storage unit of the plurality of energy storage units over the bus via power from a power supply.

2. The system of claim 1, wherein the bus comprises an electrical bus and a data bus extending to the plurality of energy storage units.

3. The system of claim 1, wherein the bus comprises a plurality of redundant buses.

4. The system of claim 1, wherein each of the plurality of energy storage units comprises a battery, a fuel cell, a supercapacitor, or any combination thereof.

5. The system of claim 1, wherein the plurality of energy storage units comprises a plurality of uniformly distributed energy storage units, a plurality of non-uniformly distributed energy storage units, or a combination thereof.

6. The system of claim 1, comprising the plurality of electrical actuators coupled to the bus, a plurality of subsea components driven by the respective plurality of electrical actuators, one or more subsea structures having the plurality of subsea components, or a combination thereof.

7. The system of claim 6, wherein at least one of the plurality of subsea components comprises a valve.

8. The system of claim 1, wherein the controller is configured to:

generate a power prioritization schedule for one or more of the plurality of energy storage units on the bus suitable to power each of the plurality of electrical actuators;

adjust the power prioritization schedule based on changes in one or more parameters of the plurality of energy storage units on the bus;

generate a charge prioritization schedule for one or more of the plurality of energy storage units to receive a charge from a power supply over the bus; and adjust the charge prioritization schedule based on changes in one or more parameters of the plurality of energy storage units on the bus.

9. The system of claim 1, wherein the controller is configured to:

receive a demand for power to operate the first electrical actuator of the plurality of electrical actuators;

communicate between controllers of the plurality of energy storage units in response to the demand for power; and obtain an agreement to supply power from the first energy storage unit of the plurality of energy storage units to the first electrical actuator of the plurality of electrical actuators based on the communication between the controllers.

10. A system, comprising:

a controller comprising a memory, a processor, and instructions stored on the memory and executable by the processor to control a subsea power system to:

analyze an operational parameter of the plurality of energy storage units on the bus, historical data of the plurality of energy storage units on the bus, a computer model of the subsea power system, or a combination thereof, to produce an analysis;

intelligently select the first energy storage unit of the plurality of energy storage units to meet the demand for power to operate a first electrical actuator based on the analysis;

intelligently select the second energy storage unit for a charge cycle based on the analysis;

selectively discharge a first energy storage unit of a plurality of energy storage units over a bus to supply power to the first electrical actuator of a plurality of electrical actuators, wherein the subsea power system has the plurality of energy storage units coupled to the bus at a plurality of positions distributed throughout the subsea power system; and selectively charge a second energy storage unit of a plurality of energy storage units over the bus via power from a power supply.

11. A system, comprising:

a subsea power system, comprising:

a bus;

a plurality of energy storage units coupled to the bus at a plurality of positions distributed throughout the subsea power system; and a controller comprising a memory, a processor, and instructions stored on the memory and executable by the processor to control the subsea power system to:

monitor a parameter of the plurality of energy storage units on the bus;

compare electrical capacities, discharge cycles, charge cycles, health criteria, or any combination thereof, of the plurality of energy storage units to generate one or more comparisons;

selectively discharge a first energy storage unit of the plurality of energy storage units over the bus to supply power to a first electrical actuator of a plurality of electrical actuators; and selectively charge a second energy storage unit of the plurality of energy storage units over the bus via power from a power supply.

12. The system of claim 11, wherein the bus comprises an electrical bus and a data bus extending to the plurality of energy storage units.

13. The system of claim 11, wherein the bus comprises a plurality of redundant buses.

14. The system of claim 11, wherein each of the plurality of energy storage units comprises a battery, a fuel cell, a supercapacitor, or any combination thereof.

15. The system of claim 11, wherein the plurality of energy storage units comprises a plurality of uniformly distributed energy storage units, a plurality of non-uniformly distributed energy storage units, or a combination thereof.

16. The system of claim 11, comprising the plurality of electrical actuators coupled to the bus, a plurality of subsea components driven by the respective plurality of electrical actuators, one or more subsea structures having the plurality of subsea components, or a combination thereof.

17. The system of claim 11, wherein the selectively discharge the first energy storage unit is based on the monitored parameter and the one or more comparisons, and wherein the selectively charge the second energy storage unit is based on the monitored parameter and the one or more comparisons.

18. The system of claim 11, wherein the controller is configured to:
   schedule diagnostics of the plurality of energy storage units based on the monitored parameter and the one or more comparisons; or
   schedule a replacement of at least one of the plurality of energy storage units based on the monitored parameter and the one or more comparisons;
   or a combination thereof.

19. The system of claim 11, wherein the controller is configured to operate the subsea power system selectively in one of a discharge mode, a charge mode, and an idle mode.

20. The system of claim 11, wherein the controller is configured to:
   generate an even wear schedule to discharge and charge the plurality of energy storage units to provide an even end of life of the plurality of energy storage units;
   generate a selective wear schedule to discharge and charge the plurality of energy storage units to provide a variable end of life of the plurality of energy storage units; and
   select the even wear schedule or the selective wear schedule to control an end of life of the plurality of energy storage units.

* * * * *